United States Patent
Lee et al.

(10) Patent No.: US 12,249,052 B2
(45) Date of Patent: Mar. 11, 2025

(54) CORRECTION OF FLOW PROJECTION ARTIFACTS IN OCTA VOLUMES USING NEURAL NETWORKS

(71) Applicants: Carl Zeiss Meditec, Inc., Dublin, CA (US); Carl Zeiss Meditec AG, Jena (DE)

(72) Inventors: Aaron Lee, Seattle, WA (US); Warren Lewis, Yellow Springs, OH (US); Luis De Sisternes, San Francisco, CA (US); Theodore Spaide, Seattle, WA (US)

(73) Assignees: Carl Zeiss Meditec, Inc., Dublin, CA (US); Carl Zeiss Meditec AG, Jena (DE)

(*) Notice: Subject to any disclaimer, the term of this patent is extended or adjusted under 35 U.S.C. 154(b) by 339 days.

(21) Appl. No.: 17/909,220

(22) PCT Filed: Mar. 26, 2021

(86) PCT No.: PCT/EP2021/058038
§ 371 (c)(1),
(2) Date: Sep. 2, 2022

(87) PCT Pub. No.: WO2021/198112
PCT Pub. Date: Oct. 7, 2021

(65) Prior Publication Data
US 2023/0091487 A1  Mar. 23, 2023

Related U.S. Application Data

(60) Provisional application No. 63/002,172, filed on Mar. 30, 2020.

(51) Int. Cl.
*G06T 5/77* (2024.01)
*G06T 7/00* (2017.01)

(52) U.S. Cl.
CPC .............. *G06T 5/77* (2024.01); *G06T 7/0012* (2013.01); *G06T 2207/10101* (2013.01); *G06T 2207/20081* (2013.01); *G06T 2207/20084* (2013.01)

(58) Field of Classification Search
USPC ........................................................ 382/128
See application file for complete search history.

(56) References Cited

U.S. PATENT DOCUMENTS

2021/0183019 A1   6/2021   Uchida et al.

FOREIGN PATENT DOCUMENTS

CN     110555856 A   * 12/2019
WO     2020049828      3/2020

OTHER PUBLICATIONS

Devalla et al., "A Deep Learning Approach to Denoise Optical Coherence Tomography Images of the Optic Nerve Head", Scientific Report, received Oct. 18, 2018, and published on Oct. 18, 2019; (Year: 2019).*

(Continued)

*Primary Examiner* — Jacky X Zheng
(74) *Attorney, Agent, or Firm* — Snell & Wilmer L.L.P.

(57) ABSTRACT

A system and/or method uses a trained U-Net neural network to remove flow artifacts from optical coherence tomography (OCT) angiography (OCTA) data. The trained U-Net receives as input both OCT structural volume data and OCTA volume data, but expands the OCTA volume data to include depth information. The U-Net applies dynamic pooling along the depth direction and weighs more heavily the portion of the data that follows (e.g., along the contours of) select retinal layers. In this manner the U-Net applies contextually different computations at different axial locations based at least in part on the depth index information and/or (e.g., proximity to) the select retinal layers. The U-net (Continued)

outputs OCT volume data of reduced flow artifacts as compared with the input OCTA data.

20 Claims, 12 Drawing Sheets

(56) References Cited

OTHER PUBLICATIONS

Japanese Patent Office; Japan Office Action issued Apr. 10, 2024 in Application No. 2022-559745.
Sripad Krishna Devalla, et al.; A Deep Learning Approach to Denoise Optical Coherence Tomography Images of the Optic Nerve Head; Sep. 28, 2018.

* cited by examiner

FIG. 9

Layr1: Inner Limiting Membrane (ILM)
Layr2: (Retinal) Nerve Fiber Layer (RNFL or NFL)
Layr3: Ganglion Cell Layer (GCL)
Layr4: Inner Plexiform Layer (IPL)
Layr5: Inner Nuclear Layer (INL)
Layr6: Outer Plexiform Layer (OPL)
Layr7: Outer Nuclear Layer (ONL)
Layr8: Junction between Outer Segments (OS) and Inner Segments (IS)
Layr9: Externa/Outer Limiting Membrane (ELM/OLM)
Layr10: Retinal Pigment Epithelium (RPE)
Layr11: Bruch's Membrane (BM)

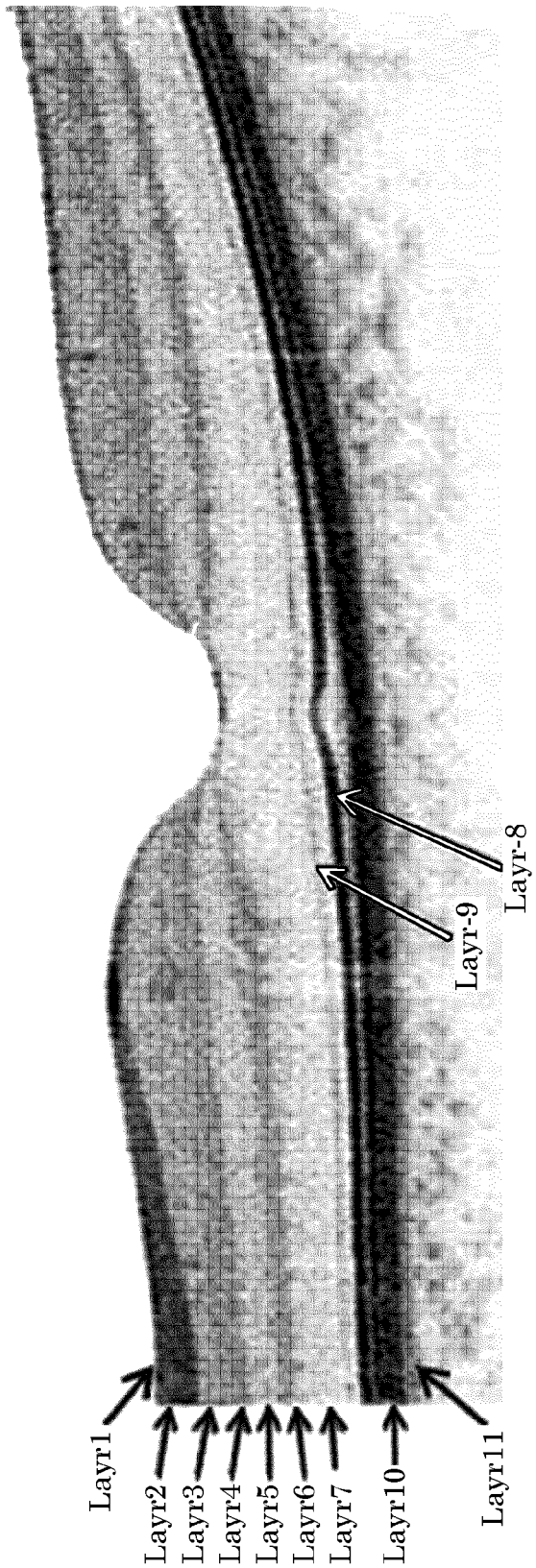

CORRECTION OF FLOW PROJECTION ARTIFACTS IN OCTA VOLUMES USING NEURAL NETWORKS

PRIORITY

This application is a National Phase application under 35 U.S.C. § 371 of International Application No. PCT/EP2021/058038, filed Mar. 26, 2021, which claims priority to U.S. Provisional Application Ser. No. 63/002,172, filed Mar. 30, 2020, the contents of which are hereby incorporated by reference in their entirety.

FIELD OF INVENTION

The present invention is generally directed to improving optical coherence tomography (OCT) images and OCT angiographic images. More specifically, it is directed to removing flow artifacts/decorrelation tails in OCT-based images.

BACKGROUND

Optical coherence tomography (OCT) is a non-invasive imaging technique that uses light waves to produce cross-section images of tissue, e.g., retinal tissue. For example, OCT permits one to view the distinctive tissue layers of the retina. Generally, an OCT system is an interferometric imaging system that determines a scattering profile of a sample along an OCT beam by detecting the interference of light reflected from a sample and a reference beam creating a three-dimensional (3D) representation of the sample. Each scattering profile in the depth direction (e.g., z-axis or axial direction) is reconstructed individually into an axial scan, or A-scan. Cross-sectional, two-dimensional (2D) images (B-scans), and by extension 3D volumes (C-scans or cube scans), may be built up from many A-scans acquired as the OCT beam is scanned/moved through a set of transverse (e.g., x-axis and y-axis) locations on the sample. OCT also permits construction of a frontal view (e.g., en face) 2D image of a select portion of a tissue volume (e.g., a target tissue slab or target tissue layer(s) of the retina). An extension of OCT is OCT angiography (OCTA), which identifies (e.g., renders in image format) blood flow in a tissue layer. OCTA may identify blood flow by identifying differences over time (e.g., contrast differences) in multiple OCT images of the same retinal region, and designating differences that meet predefined criteria as blood flow.

OCT is susceptible to different types of image artifacts, including decorrelation tails, or shadows, wherein structures/constructions (e.g., tissue or vascular formations) in an upper tissue layer produce "shadows" in a lower tissue layer. In particular, OCTA is prone to flow projection artifacts, in which images of blood vessels may be rendered at erroneous locations. This may be due to the high scattering property of blood within overlying vessels, creating artifacts that interfere with the interpretation of retinal angiographic results. In other words, deeper tissue layers may have projection artifacts due to fluctuating shadows cast by flowing blood in large inner retinal vessels above them that cause variation in the reflected signal. The signal variation may falsely be interpreted as (blood) flow, which cannot easily be differentiated from true flow.

Methods have been developed to try to overcome these problems, either by correcting the artifacts in a previously defined and generated en face slab or by correcting the artifacts in an OCT volume. Examples of slab-based methods for correcting projection artifacts in en face slabs may be found in: "A Fast Method to Reduce Decorrelation Tail Artifacts in OCT Angiography", by H Bagherinia et al., Investigative Ophthalmology & Visual Science, 2017, 58 (8), 643-643; "Projection Artifact Removal Improves Visualization and Quantitation of Macular Neovascularization Imaged by Optical Coherence Tomography Angiography", by Zhang Q. et al., Ophthalmol Retina, 2017, 1(2), 124-136; and "Minimizing projection artifacts for accurate presentation of choroidal neovascularization in OCT micro-angiography", by Anqi Zhang et al., Biomedical Optics Express, 2015, Vol. 6, No. 10, all of which are herein incorporated in their entirety by reference. In general, such slab-based methods may have several limitations and dependencies that are difficult to overcome (e.g., they are segmentation-dependent) and do not allow the visualization of corrected data in a plane other than in the target slab. Consequently, they do not allow 3D techniques for visualization, segmentation, or quantification of OCTA flow properties. Slab-based methods may also produce a sub-optimal processing workflow where an artifact-correction algorithm must be executed every time there is a change in the target slab definition, no matter how minimal this change might be, or if a current target slab definition is reverted to that from a previous step.

Examples of volume-based methods for correcting projection artifacts in OCT volumes are describes in: U.S. Pat. No. 10,441,164 assigned to the same assignee as the present invention; "Projection-resolved optical coherence tomographic angiography", by Zhang M et al., Biomed Opt Express, 2016, Vol. 7, No. 3; "Visualization of 3 Distinct Retinal Plexuses by Projection-Resolved Optical Coherence Tomography Angiography in Diabetic Retinopathy", by Hwang T S et al., JAMA Ophthalmol. 2016; 134(12); "Volume-Rendered Projection-Resolved OCT Angiography: 3D Lesion Complexity is Associated with Therapy Response in Wet Age-Related Macular Degeneration", Nesper P L et al., Invest Ophthalmol Vis Sci., 2018; Vol. 59, No. 5.; and "Projection Resolved Optical Coherence Tomography Angiography to Distinguish Flow Signal in Retinal Angiomatous Proliferation from Flow Artifact", by Fayed A E et al., PLOS ONE, 2019, 14(5), all of which are herein incorporated in their entirety by reference. Generally, volume-based methods overcome some of the problems found in the slab-based methods and allow for visualization of corrected flow data in planes other than the (target) en face slab (e.g., in a B-scan), and allow for the processing of corrected volumetric data. However, volume-based methods can be slow, since they require the analysis of large 3D data arrays, and rely on hand-crafted assumptions that may not hold true for all vessel manifestations.

What is needed is a volume-based method of flow artifact correction that is fast, and provides results as good as slab-based methods, which are well-established in the industry, but is not segmentation-dependent nor hindered by the other limitations of slab-based methods.

It is an object of the present invention to provide a volume-based flow artifact correction method that provides faster results than are achievable with current methods.

It is another object of the present invention to provide a method of flow artifact correction that achieves results similar to those of a custom mathematical formulaic approach, but which is characterized by easy parallelization of its computer processing.

It is a further object of the present invention to provide a volume-based flow artifact correction system that may be readily implemented with the computing power of existing OCT systems, and whose implementation does not place an undue time burden on existing clinical procedures.

SUMMARY OF INVENTION

The above objects are met in a method/system for correcting for (e.g., removing or reducing) flow artifacts in optical coherence tomography angiography (OCTA) using a neural network approach. If one were to construct a mathematical formula for correcting flow artifacts in each individual A-scan, one might estimate the amount of flow signal due to a tail artifact by analyzing the frame repetitions, modulation properties of the OCT signal, and scattering properties of the human retina. This approach may provide good results, but such a hand-crafted, formulaic approach may vary from instrument to instrument and be affected by differing retina opacities and scattering properties in each subject, which would complicate its implementation and make it impractical for clinical settings.

Other handcrafted approaches may have similar limitations of being too complicated, time-consuming, and/or computer resource intensive (e.g., require computer processing resources not available in existing OCT/OCTA systems), particularly when applying flow artifact correction to a volume scan (e.g., a volume-based approach). The present invention overcomes some of the limitations found in previous handcrafted approaches by use of a method/system that corrects for projection artifacts in OCTA volumes and is based on neural networks. The present approach can execute faster than handcrafted approaches due, at least in part, to lending itself to easy parallelization of its processing. It is further put forth that the present invention may also correct some isolated errors made by other volume-based methods in some vessel manifestations.

The present invention uses a neural network architecture for the correction of the flow projection artifacts in OCTA volumes, and has been shown to produce good results in both healthy and diseased subjects and to be independent of any slab definition or segmentation. The present approach may be trained with original OCT structure volumes and OCTA flow volumes as inputs to produce a (OCTA) flow volume (or an OCT structure volume) without (or reduced) projection/shadow artifacts as output. The gold standard training samples used as target outputs to train the neural network (e.g., the training samples used as target, training output samples) may be generated by use of one or more hand-crafted approaches, as described above and or known in the art (including one or more slab-based and/or volume-based algorithms, singularly or in combination), that correct decorrelation tail artifacts (e.g., flow artifacts or shadows), applied to a set of sample cases (e.g., sample OCT/OCTA volumes) where it is known that the majority of the A-scans in each volume show good (or satisfactory) results. Although such hand-crafted algorithms (particularly volume-based algorithms) may be computer intensive and require long execution times, this is not a burden since their execution time is part of a test data (or training sample) gathering stage for training, and not part of the execution of the present invention (e.g., execution/use of the already trained neural network in the field, such as within a clinical setting).

The present invention is achieved, at least in part, through the employment of neural networks using both structure and flow data to solve the present problem, and through the design of a custom neural network to solve it. Apart from saving time, the present neural network solution considers both structure and flow in analyzing OCTA data. In addition to correcting for flow artifacts, the present neural network may also correct other remaining artifacts that handcrafted approaches may fail to correct.

Other objects and attainments together with a fuller understanding of the invention will become apparent and appreciated by referring to the following description and claims taken in conjunction with the accompanying drawings.

Several publications may be cited or referred to herein to facilitate the understanding of the present invention. All publications cited or referred to herein, are hereby incorporated herein in their entirety by reference.

The embodiments disclosed herein are only examples, and the scope of this disclosure is not limited to them. Any embodiment feature mentioned in one claim category, e.g., system, can be claimed in another claim category, e.g., method, as well. The dependencies or references back in the attached claims are chosen for formal reasons only. However, any subject matter resulting from a deliberate reference back to any previous claims can be claimed as well, so that any combination of claims and the features thereof are disclosed and can be claimed regardless of the dependencies chosen in the attached claims.

BRIEF DESCRIPTION OF THE DRAWINGS

In the drawings wherein like reference symbols/characters refer to like parts:

FIG. 9 shows an exemplary OCT B-scan image of a normal retina of a human eye, and illustratively identifies various canonical retinal layers and boundaries.

DESCRIPTION OF THE PREFERRED EMBODIMENTS

Figure 1:
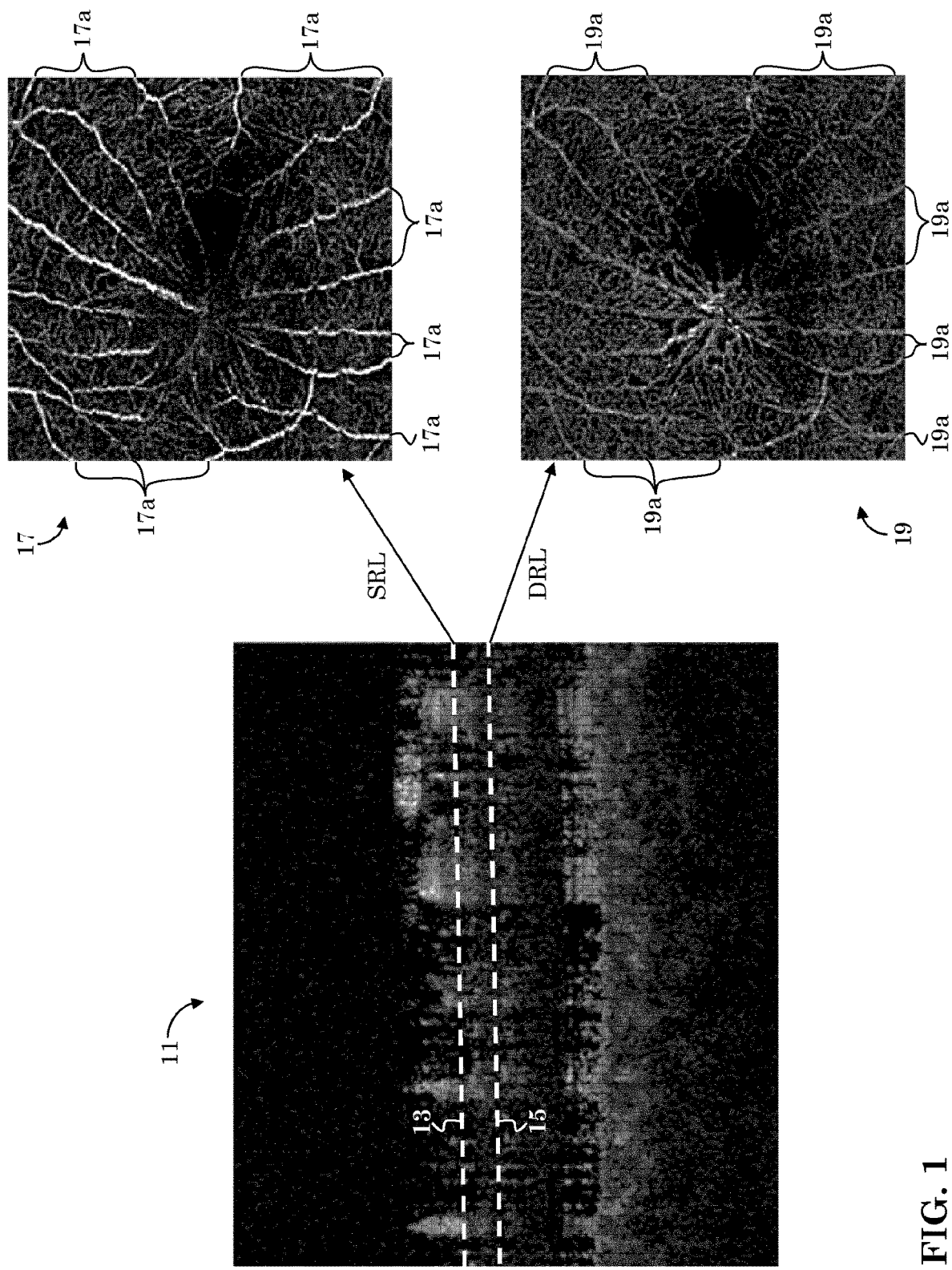
FIG. 1 shows an exemplary OCTA B-scan of a human retina with an upper hash line and a lower hash line respectively indicating the locations of traversing en face images of a superficial retinal layer (SRL) and a deeper retinal layer (DRL).

Optical coherence tomography (OCT) is an imaging technique that uses low-coherence light to capture micrometer-resolution, 2D and 3D images from within optical scattering media (e.g., biological tissue). OCT is a non-invasive, interferometric imaging modality that enables in vivo imaging of the retina in cross-section. OCT provides images of ophthalmic structures, and has been used to quantitatively evaluate retinal thickness and assess qualitative anatomic changes such as the presence or absence of pathologic features, including intraretinal and subretinal fluid. A more detailed discussion of OCT is provided below.

Advances in OCT technology have resulted in the creation of additional OCT-based imaging modalities. OCT Angiography (OCTA) is one such imaging modality that has rapidly gained clinical acceptance. OCTA images are based on the variable backscattering of light from the vascular and neurosensory tissue in the retina. Since the intensity and phase of backscattered light from retinal tissue varies based on the intrinsic movement of the tissue (e.g., red blood cells move, while neurosensory tissue is generally static), OCTA images are essentially motion-contrast images. This motion-contrast imaging provides high resolution, and non-invasive images of the retinal vasculature in an efficient manner.

OCTA images may be generated by applying one of a number of known OCTA processing algorithms to OCT scan data, typically collected at the same or approximately the same transverse locations on a sample at different times, to identify and/or visualize regions of motion or flow. Therefore, a typical OCT angiography data set may contain multiple OCT scans repeated at the same transverse locations. Motion contrast algorithms may be applied to the intensity information derived from the image data (intensity-based algorithm), the phase information from the image data (phase-based algorithm), or the complex image data (complex-based algorithm). The motion contrast data may be collected as volume data (e.g., cube data) and displayed in multiple ways. For example, an en face vasculature image is a frontal, planar image displaying motion contrast signals in which the data dimension corresponding to depth (e.g., "depth dimension" or imaging z-axis of the system to the sample) is displayed as a single representative value, typically by summing or integrating all or an isolated portion (e.g., a slab defined by two specific layers) of the volume data.

OCTA is prone to decorrelation tail artifacts due to the high scattering property of blood within overlying vessels, creating artifacts that interfere with the interpretation of retinal angiographic results. In other words, deeper layers may have projection artifacts due to fluctuating shadows cast by flowing blood in retinal vessels above them that may cause variation in the reflected signal. This signal variation may manifest itself as a decorrelation that cannot be easily differentiated from true flow.

One of the steps in a standard OCT angiography algorithm involves producing 2D angiography vasculature images (angiograms) of different regions or slabs of the tissue along (and traversing or perpendicular to) the depth dimension from the obtained flow contrast images, which may help a user visualize vasculature information from different retinal layers. A slab image (e.g., en face image) may be generated by summing, integrating, or other techniques to select a single representative value of the cube motion contrast data along a particular axis between two selected layers (see for example U.S. Pat. No. 7,301,644, the contents of which are hereby incorporated by reference). The slabs that are most affected by decorrelation tail artifacts may include, for example, Deeper Retinal Layer (DRL), Avascular Retinal Layer (ARL), Choriocapillaris Layer (CC), and any custom slab, especially the ones that contain the Retinal Pigment Epithelium (RPE).

FIG. 1 shows an exemplary OCTA B-scan 11 of a human retina with an upper hash line 13 and lower hash line 15 respectively indicating the locations of where two traversing en face images are defined. Upper hash line 13 indicates a superficial retinal layer (SRL) 17 located near the top of the retina, and lower hash line 15 indicates a deeper retinal layer (DRL) 19. In the present example, deeper retinal layer 19 is the target slab that one may want to examine, but since it is located below the superficial retinal layer 17, vasculature patterns 17*a* in the upper, en face SRL layer 17 may manifest flow projections (e.g., decorrelation tails or shadows) 19*a* in the target, deeper, en face DRL layer 19, which may erroneously be identified as true vasculature. It would be beneficial to correct for (e.g., remove or reduce) the flow projection (e.g., decorrelation) artifacts 19*a* in the target slab 19 for better visualization and interpretation.

Figure 2:
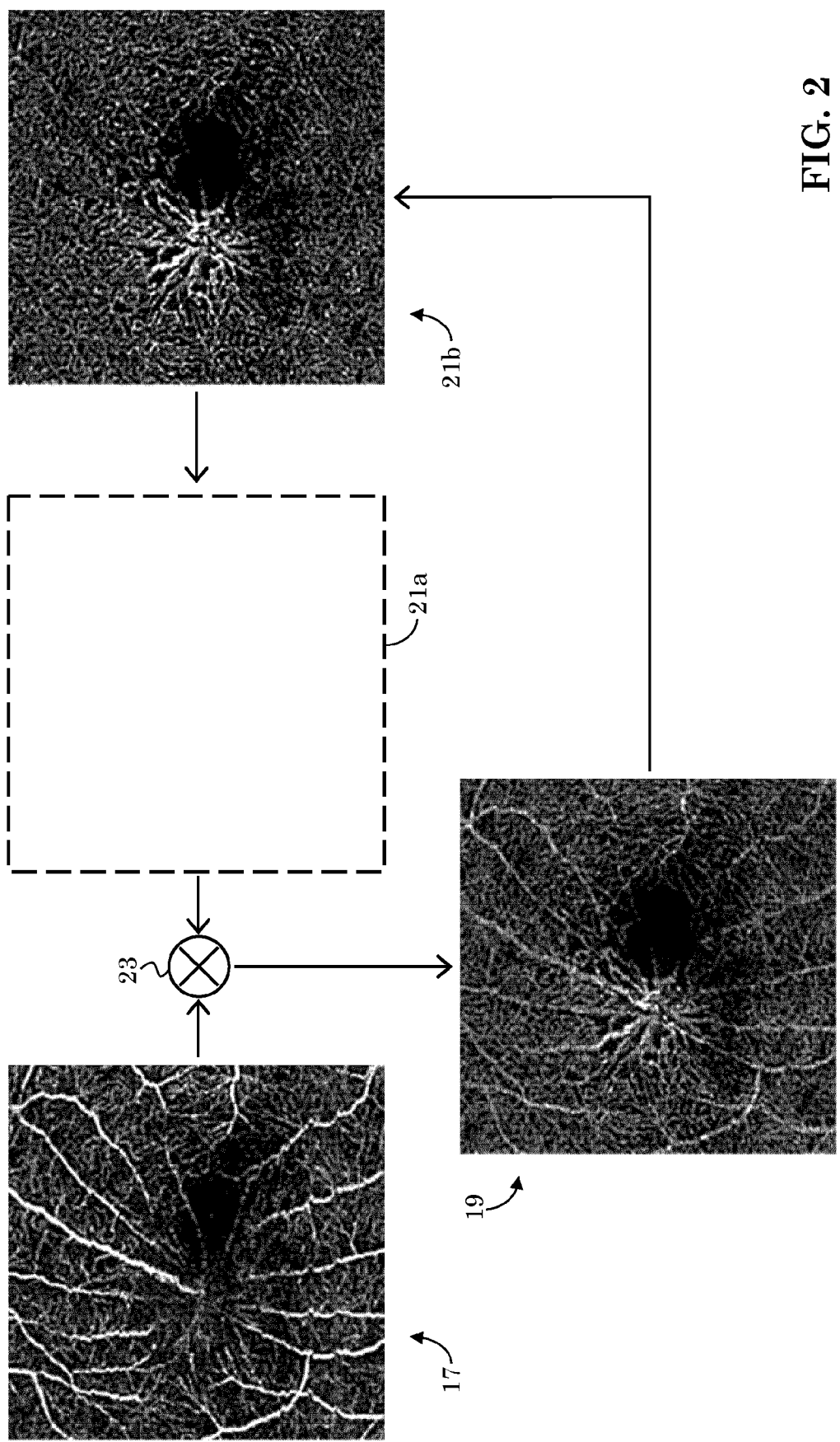
FIG. 2 illustrates a slab-based method for removing flow artifacts from a target en face slab, such as the DRL of FIG. 1, and suitable for use with the present invention, such as in the definition of training input/output sets for a neural network in accord with the present invention.

Flow projection artifacts are typically corrected by slab-based or volume-based methods. Slab-based methods correct an individual, target en face slab (a topographic projection of an OCTA sub-volume defined within two selected surfaces/layers within an OCTA volume) one at a time. A slab-based method may require the use of two (en face) slab images (e.g., an upper slab image and a lower slab image). That is, a slab-based method may require information from an additional, upper reference slab defined at a higher depth position (e.g., above the target en face slab) to identify and correct for shadows in the deeper/lower, target en face slab. For example as illustrated in FIG. 2, a slab-based method may assume that the deeper, target en face slab (e.g., DRL image 19) is the result of (e.g., may be generated by) mixing the upper reference slab (e.g., SRL 17) and a theoretical, artifact-free slab 21*a* (the unknown, decorrelation-tail free, image to be reconstructed). Artifacts can then be removed using a choice of mixing model 23, which may, for example, be additive or multiplicative in nature. For example, the mixing model 23 may be applied iteratively until a decorrelation-tail free image 21*b* is generated. It is to be understood that at each iteration, a current (e.g., interim) generated image 21*b* may take the place of the theoretical slab 21*a* in the mixing model 23 until a final generated image 21*b* with sufficient decorrelation-tail correction is achieved.

Slab-based methods for removal of shadow artifacts have been shown effective, but have a number of limitations. Firstly, both the target slab to be corrected and the upper reference slab are determined by the definition of two respective pairs of surfaces/layers, which are typically defined by an automated layer segmentation algorithm. Errors in the layer segmentation and/or unknowns in the relationship between the target and reference slabs may lead to the removal of important information in the corrected slab. For example, true blood vessels that are partially present in both the target slab and the upper reference slab may be erroneously removed from the corrected slab. Conversely, the slab-based method may fail to remove some severe artifacts, such as artifacts due to vessels that are not present in the reference slab due to errors in its definition.

The effectiveness of a slab-based method may be dependent upon the slab definition (e.g., how the slab is defined/generated). For example, a slab-based method may work satisfactorily for slabs generated using a maximum projection method, but this may not be the case when the slabs are generated using a summation projection method. In the case of a thick slab definition, for example, projection artifacts may overpower real sample signals as the projection artifacts propagate deeper into the slab (e.g., volume). This may result in the masking of the real signal in the slab and the inability to display it even after the artifacts are corrected.

Two additional limitations are a direct result of the nature of slab-based methods. As is explained above, in a slab-based method, only a single target slab may be corrected at a time. Consequently, the slab-based algorithm needs to be executed every time there is a change in the target slab definition, no matter how minimal this change may be, or if that definition is reverted to one from a previous step. This translates to increased processing time and memory requirements as a user modifies the surfaces/layers that define the target slab to visualize select vessels of interest. Additionally, slab-based corrections can only be viewed or processed in the slab plane (e.g., in the en face plane, or frontal planar view perpendicular to the imaging z-axis of the OCT system). As a result, B-scans (or cross-sectional images slicing into the volume) cannot be viewed, and volumetric analysis of results is not possible.

Volume-based methods may alleviate some of these limitations, but traditional volume-based methods have posed their own limitations. Some traditional volume-based methods have been based on similar ideas as slab-based methods, but implemented in an iteratively manner to multiple target slabs spanning a whole volume. For example, to correct a whole volume, a moving deformable window (e.g., a moving target slab) may be axially moved throughout an OCTA cube depth and a slab-based method may be applied at each window position. Another volume-based method is based in an analysis of peaks in the flow OCTA signal at different depths for each A-scan. Irrespective, volume-based methods have traditionally been very time consuming, since analysis is done iteratively or by peak-search and it is no easy task to parallelize their implementation in a parallel computer processing system. Additionally, traditional volume-based methods have been based on handcrafted assumptions that, while producing generally satisfactory results, may not hold true for all kind of vessel manifestations. For example, volume-based methods based on a moving window have to overcome the challenge of determining exactly where a vessel ends and a (decorrelation) tail begins. While sophisticated assumptions about vessel have been proposed to make better corrections, artifacts can still be observed at the edges of large vessels. Methods based on peak analysis rely on optical bench measurements that do not necessarily replicate retinal properties for all subjects with sufficient accuracy, and tend to make a binary decision when removing (decorrelation) tails in each A-scan, which may remove true flow data in deep retinal locations.

As opposed to the above-described, handcrafted solutions to correct for flow projection artifacts in angiography flow slabs or volumes, the presently preferred embodiment applies a neural network solution that is trained to use both the structure data (e.g., OCT structural data) and flow data (e.g., OCTA flow contrast data) as training inputs and learns the specific characteristics of the projection (flow) artifacts versus real (true) vessels. This approach has been shown advantageous over handcrafted volume-based approaches. For example, the present neural network model can process large volume data at faster rates than handcrafted algorithms that correct for flow projections in a volume using an iterative approach or by finding peaks in every A-scan. The faster processing time of the present approach may, at least in part, benefit from easier parallelization of the present model in a general purpose graphics processing unit (GPGPU) optimized for parallel operation, but other computer processing architectures may also benefit from the present model. Additionally in the present approach, fewer assumptions are made when processing the data. Given an appropriate gold standard as the target (e.g., target training output), the present neural network can learn the characteristics of the flow artifacts and how to reduce them using both the structure and flow data without making handcrafted assumptions that may vary throughout the data and might be difficult to estimate with a heuristic approach. It is further put forth that imperfectly corrected data can also be used as gold standard for training the present neural network as long as it is reasonably correct. The present method may also improve the output, depending on the network architecture used and the amount of available training data, as the present neural network learns the overall behavior of the combined structure and flow data that characterizes the artifacts. For example, if the training output set corrects for additional artifact errors, in addition to flow artifacts, such as noise, then the trained neural network may also correct for these additional artifact errors.

The presently preferred neural network is primarily trained to correct for projection artifacts in OCTA volumes, but is trained using training input data pairs consisting of OCT structural data and corresponding OCTA flow data of the same sample/region. That is, the present method uses both structural and flow information to correct the artifacts and can be independent of segmentation lines (e.g., layer definitions) and slab definitions. The trained neural network may receive a test OCTA volume (e.g., newly obtained OCTA data not previously used in the training of the neural network), and produce a corrected flow (OCTA) volume, which can be used for visualization or processing of corrected flow data in different planes and in three dimensions. For example, the corrected OCTA volume may be used to generate A-scan images, B-scan images, and/or en face images of any region of the corrected OCTA volume.

Figure 3:
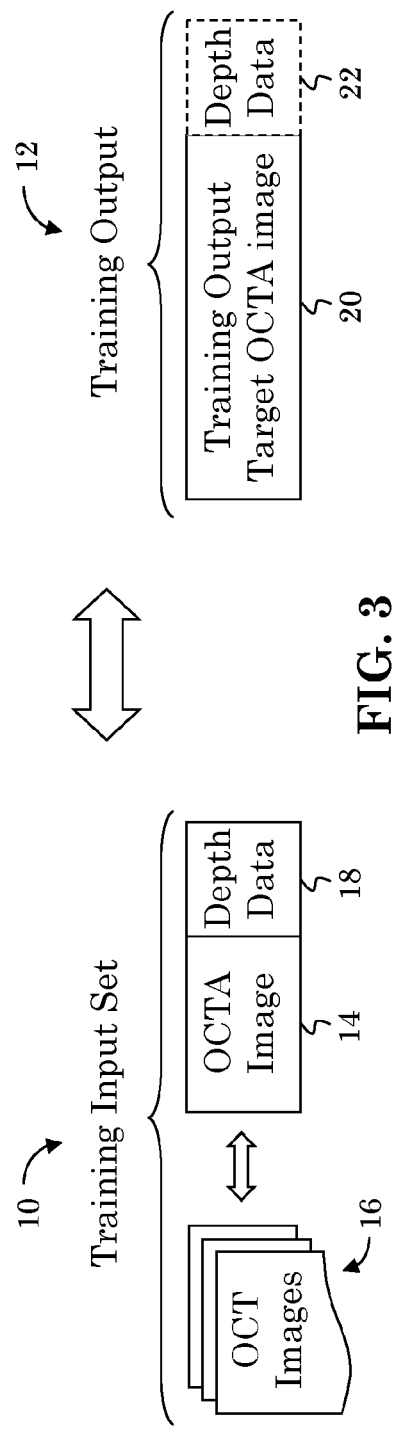
FIG. 3 shows an exemplary training input/output set including a training input (image) set and a corresponding training output (image).

FIG. 3 shows an exemplary training input/output set including a training input (image) set 10 and a corresponding training output target (image) 12. As discussed above, and explained more fully below, generating an OCTA image (or scan or data set) 14 typically requires multiple OCT scans (or image data) 16 of the same retinal region, and designating differences that meet predefined criteria as blood flow. In the present case, depth data 18 (e.g., axial depth information, which may be correlated to depth information from corresponding OCT data 16) is added to the generated OCTA data 14. The generated OCTA data 16 (and optionally the individual OCT images 16) is corrected for flow artifacts and/or other artifacts, such by use of one or more handcrafted algorithm to generate the corresponding training output target OCTA image 20. Optionally, corresponding depth information 22 may also be appended to the target output OCTA image 20.

Figure 4:
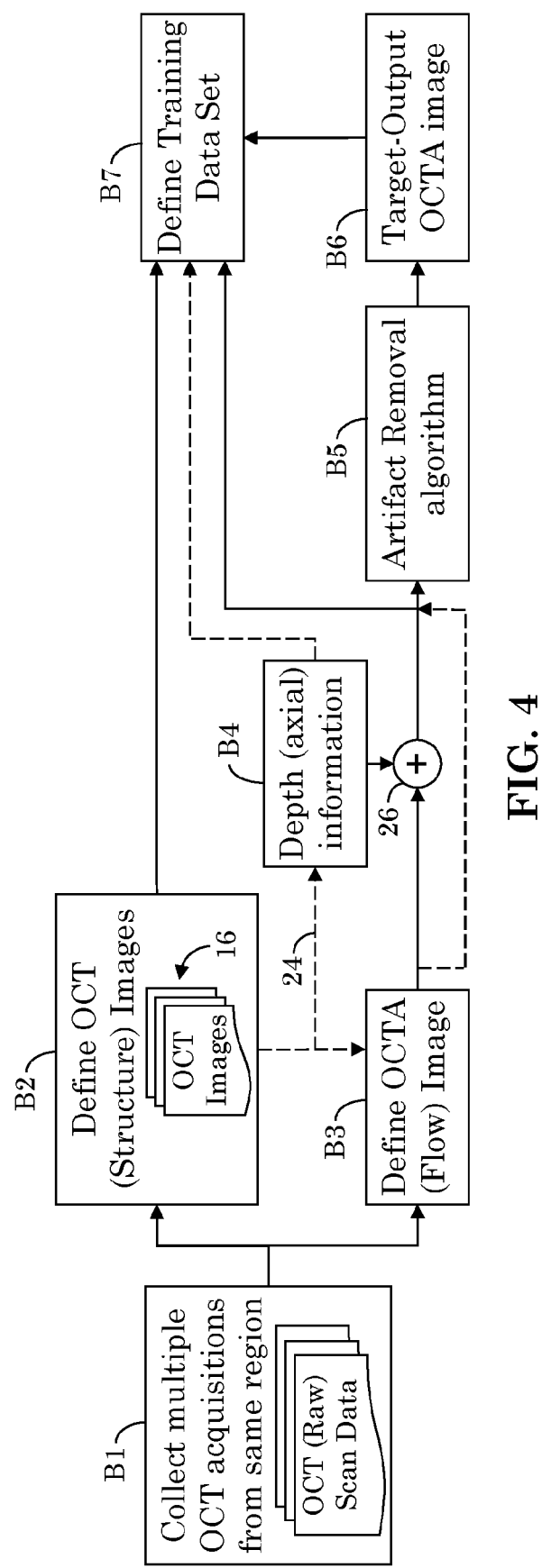
FIG. 4 illustrates a method/system for defining a training input/output set, as shown in FIG. 3, for a neural network in accord with the present invention.

FIG. 4 illustrates a method/system for defining a training input/output set, as shown in FIG. 3, for a neural network in accord with the present invention. In block B1, multiple OCT acquisitions from substantially the same region of a sample are collected. The collected OCT acquisitions may be used to define OCT (structural) images 16 (e.g., of an eye), as illustrated in block B2. The OCT (structure) image data may depict tissue structure information, such as retinal tissue layers, optic nerve, fovea, intraretinal and subretinal fluid, macular holes, macular pucker, etc. These OCT images may include one or more average images of two or more of the multiple collected OCT data, and may also correct for noise, structural shadows, opacities, and other image artifacts. Block B3 calculates motion contrast information in the collected OCT data from block B1 (and/or in defined OCT images 16 from block B2, or a combination of the two) using an OCT angiography (OCTA) processing technique to define OCTA (flow) image data. The defined flow image depicts vasculature flow information and may contain artifacts, such as projection artifacts, decorrelation tails, shadow artifacts, and opacities. Optionally, as illustrated by symbol 26, depth index information may be assigned (or appended) to the flow image along its axial direction. This depth information may be correlated to the defined OCT images used to define the flow data, as indicated by dashed arrow 24 and block B4. The defined OCTA images from block B3 (optionally with or without the appended depth information) is submitted to an artifact removal algorithm (block B5) to define a corresponding target-output OCTA image (e.g., training output target OCTA image 20 of FIG. 3) of reduced artifacts, as illustrated by block B6. In block B7, the OCT (structure) images, defined OCTA (flow) images, and target-output OCTA images (optionally also depth index information) may be grouped to define a training input/output set, as illustrated in FIG. 3. Each training-input set 10 thus includes one or more training-input OCT image 16, a corresponding training-input OCTA image 14, and depth information 18 for the axial positions of pixels within the training-input OCTA image 14. As stated above, the target output OCTA image 20 may optionally also have corresponding depth information 22 (e.g., corresponding to depth data 18). As it would be understood, multiple training input/output sets may be defined by defining multiple OCTA images 14 from corresponding sets of OCT acquisitions 16 to define multiple corresponding training-input OCTA images 20.

Thus, a neural network in accord with the present invention may be trained using a set of OCTA acquisitions with corrected flow data and a corresponding set of OCT acquisitions (from which the OCTA data may have been determined) and which may also be corrected for shadow or other artifacts. The corrected flow data may be known or precomputed a priori for training purposes, but it is not necessary to provide labels identifying corrected regions, neither in the training input set nor in the output training image. Both the (OCT) structure and (OCTA) flow cubes are used as training input, and the neural network is trained to produce an output (OCTA) flow cube where the projection artifacts are corrected. In this manner, the pre-generated corrected data (e.g., training output, target image) is used as guidance in training the neural network.

The corrected OCTA flow data that is used as training output targets in the training of the neural network may be obtained by use of handcrafted algorithms, with or without additional manual corrections, and do not need to constitute a perfect solution for the artifact correction, although its performance should be satisfactory along most (a majority) of the A-scans in the volume sample. That is, handcrafted solutions based on individual A-scan flow artifact correction, or slab-based corrections, or volume-based corrections (e.g., as described above) may be used to define the training output target volume (e.g., image) corresponding to each training input set (including a training OCTA volume and corresponding one or more OCT structural volume). Optionally, a training output target volume may be divided into training output sub-volume sets. For example, if a corrected training volume still has regions of severe flow artifacts, then it may be divided into sub-volumes and only the satisfactory portions of the corrected volume (portions excluding severe flow artifacts) may be used to define a training input set. Additionally, a corrected OCTA volume and its corresponding set of OCT samples and uncorrected OCTA volume, may be divided into corresponding sub-volume segments so as to define a larger number of training input/output sets, with each set defined by a sub-volume region.

In operation (e.g., after the neural network is trained), collected structural OCT image(s), a corresponding OCTA flow image, and assigned/determined/calculated depth index information would be submitted to the trained neural network, which would then output/produce an OCT-based image vascular image (e.g., an OCTA image) of reduced artifacts as compared to the input OCTA flow image.

Multiple types of neural networks may be used in accord with the present invention, but a preferred embodiment of the present invention uses a U-Net type neural network. A general discussion of a U-Net neural network is provided below. However, the preferred embodiment may deviate from this general U-Net, and be based on a U-Net architecture optimized for speed and accuracy. As an example, below is provided a U-Net neural network architecture used in a proof of concept implementation of the present invention.

As proof of concept, OCTA acquisitions (and their corresponding OCT data) of 6×6×3 mm field of view from 262 eyes were taken with a Swept-Source OCT device (PLEX Elite© 9000, Carl Zeiss Meditec, Inc™). Of these eyes, 153 were healthy and 109 were diseased. Of the 262 eyes, 211 (including 123 from normal eyes and 88 from diseased eyes) were used for training (e.g., used to prepare training input/output sets, including OCTA/OCT training input pairs and their corresponding, corrected output training targets), and 51 eyes (including 30 from normal eyes and 21 from diseased eyes) were used for validation (e.g., used as test inputs to validate the effectiveness of the trained neural network in a testing phase of the neural network). For each OCTA acquisition, a (e.g., volume-based) handcrafted decorrelation tail removal algorithm was used to produce the corresponding training output target corrected version of the flow volume. Similarly, (handcrafted) algorithms were also used to correct for artifacts in their corresponding OCT volume data.

In its training phase, two training approaches were examined. In both approaches, the neural network took as input the flow (OCTA) data to be corrected and the structural (OCT) data from each OCTA acquisition. Similarly in both approaches, the output of the neural network was measured against (or compared with) a ground truth (e.g., the corresponding training output target), e.g., the ideal corrected flow data. The training output target was obtained by submitting the training input OCTA acquisition to a handcrafted flow artifact correction algorithm. An example of a handcrafted volume-based projection removal algorithm is described in U.S. Pat. No. 10,441,164, assigned to the same assignee as the present application. The two approaches, however, differed in how the objective of the training was defined. For ease of discussion, the input flow data to be corrected may be termed "flow-original" and the desired, corrected flow data that the neural network is expected to produce may be termed "flow-corrected." In the first approach, the neural network was trained to predict the "flow-corrected" (e.g., closely replicate the training output target) given the "flow-original" as input. This first training approach is similar to that discussed below. The second approach differed in that its objective was to define the difference between the "flow-original" and the "flow-corrected. That is, during each training iteration (e.g., epoch) the neural network was trained to predict a "residue" based on the difference of the "flow-corrected" and the "flow-original", and this residue was added back to the flow-original. The final residue produced by the neural network was then added to the original input flow scan to define the corrected version of the input flow scan. This second approach was found to provide better results than the first approach in some cases. A reason for this may be that the first approach required the neural network to learn to reproduce the original flow image largely unchanged (e.g., the target output flow image may be very similar to the input flow image), whereas the second approach only needed to produce the residue data (e.g., provide signal data for locations corresponding to changes/differences between the training input and target output).

Figure 5:
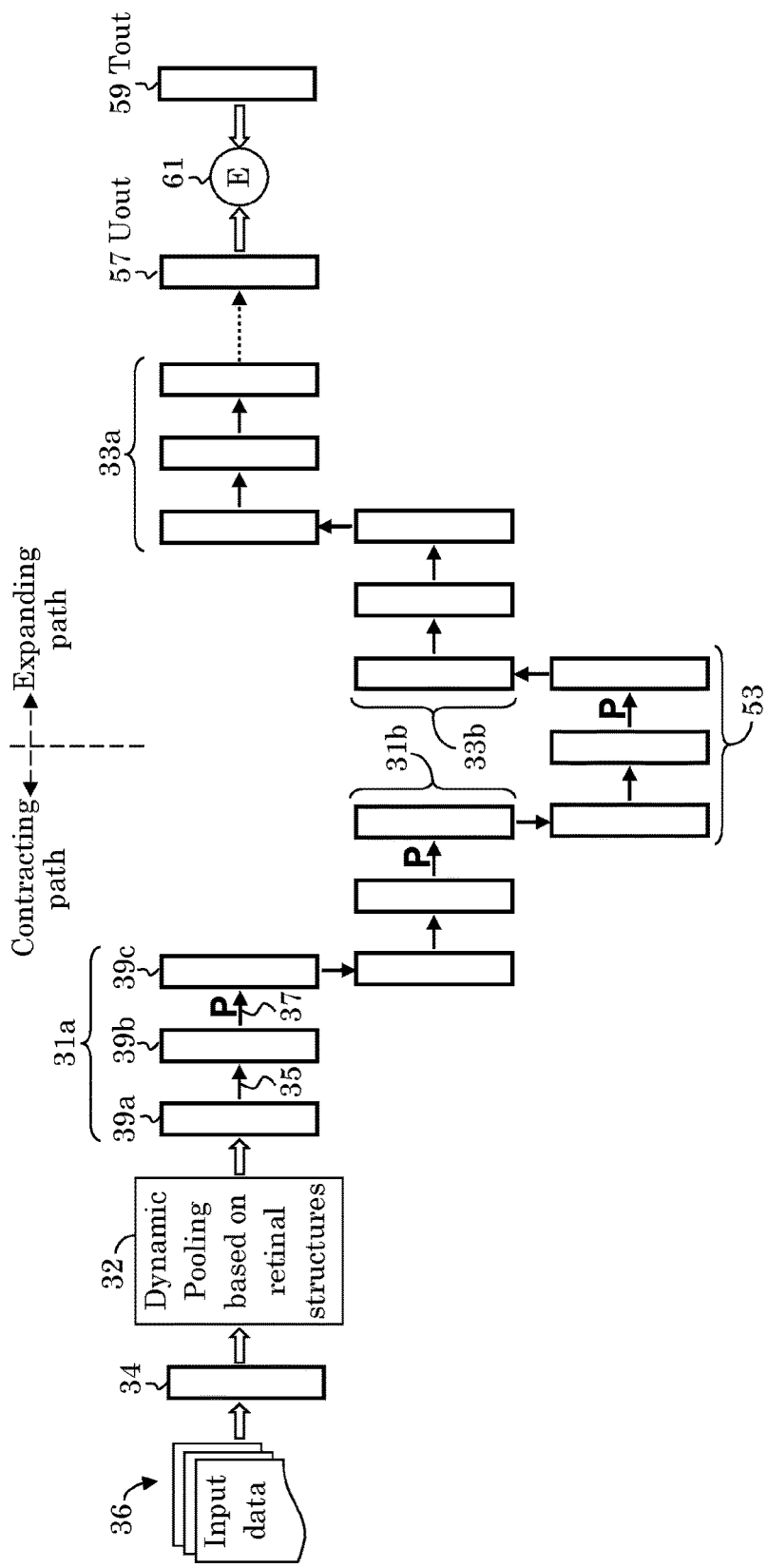
FIG. 5 provides a simplified overview of a U-Net architecture used in exemplary embodiment of the present invention.
Figure 16:
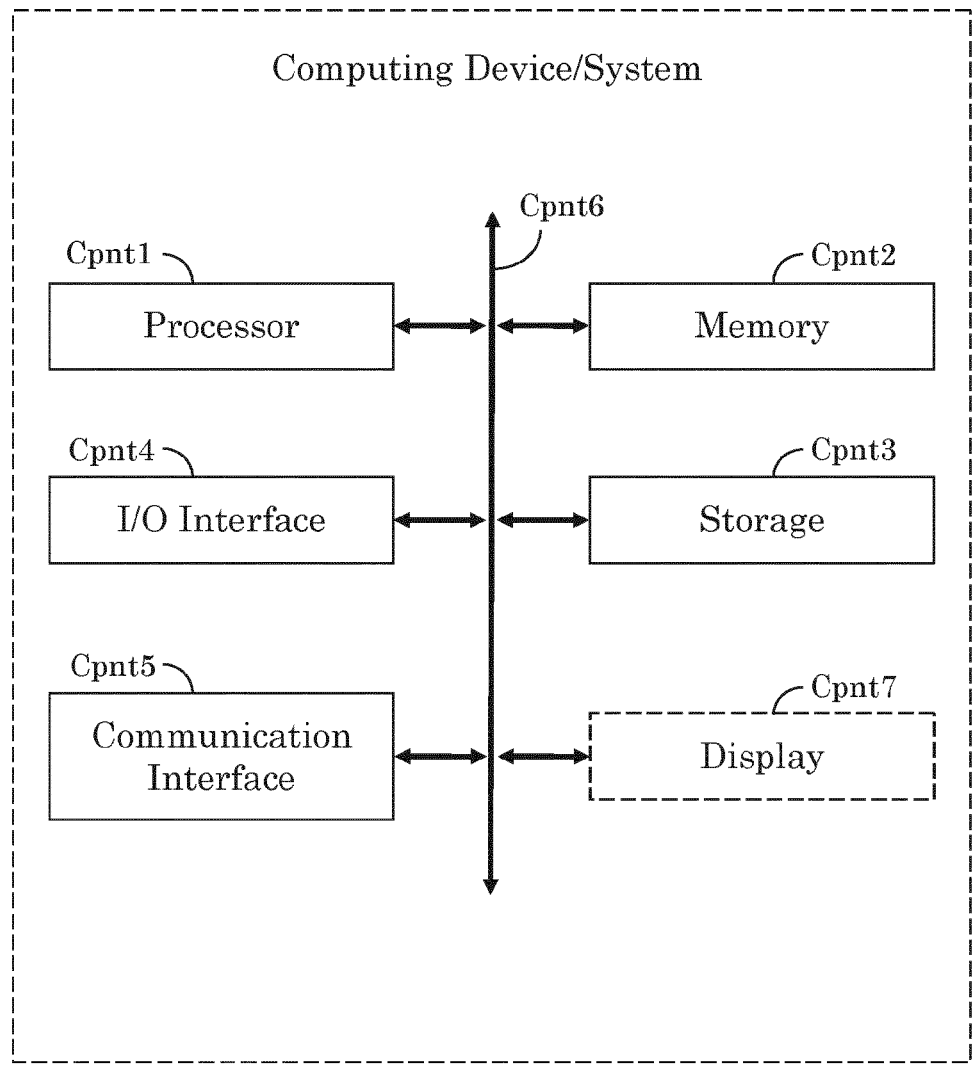
FIG. 16 illustrates an example computer system (or computing device or computer).

The present neural network is based on a general U-Net neural network architecture, such as described below with reference to FIG. 16, but with some changes. FIG. 5 provides a simplified overview of the U-Net architecture used in an exemplary embodiment of the present invention. A first change from that of FIG. 16 is that the total number of layers in the present machine learning model is reduced. The present embodiment has two downsampling blocks (e.g., encoding modules) 31a/31b in its contracting path and two corresponding upsampling blocks (e.g., decoding modules) 33a/33b in its expanding path. This is in contrast to the example U-Net of FIG. 16, which has four downsampling blocks and four upsampling blocks. This reduction in downsampling and expanding blocks improves performance in terms of speed while still producing satisfactory results. It is to be understood, however, that a suitable U-Net may have more or fewer downsampling and corresponding upsampling blocks without deviating from the present invention. Additional downsampling/upsampling blocks may produce better results at the expense of longer training (and/or execution) times. In the present example, each downsampling block 31a/31b and upsampling block 33a/33b is comprised of three layers 39a, 39b, and 39c, each of which is representative of the of image data (e.g., volume data) at a given processing stage, but it is to be understood that the downsampling and upsampling blocks may have more or fewer layers. Although not indicated for the sake of simplicity, it is also to be understood that the present U-Net may have copy-and-crop links (e.g., similar to links CC1 to CC4 of FIG. 16) between corresponding downsampling and upsampling blocks. These copy-and-crop links may copy the output of one downsampling block and concatenate it to the input of its corresponding upsampling block.

The different operations of the present U-Net are illustrated/indicated by an arrow-key chart. Each downsampling block 31a/31b applies two set of operations. The first set, indicated by arrows 35, is similar to that of FIG. 16 and includes a (e.g., 3×3) convolution and activation function (e.g., a rectified linear (ReLU) unit) with batch normalization. The second set, indicated by P-arrow 37, however, differs from that of FIG. 16 and adds column pooling.

Figure 6:
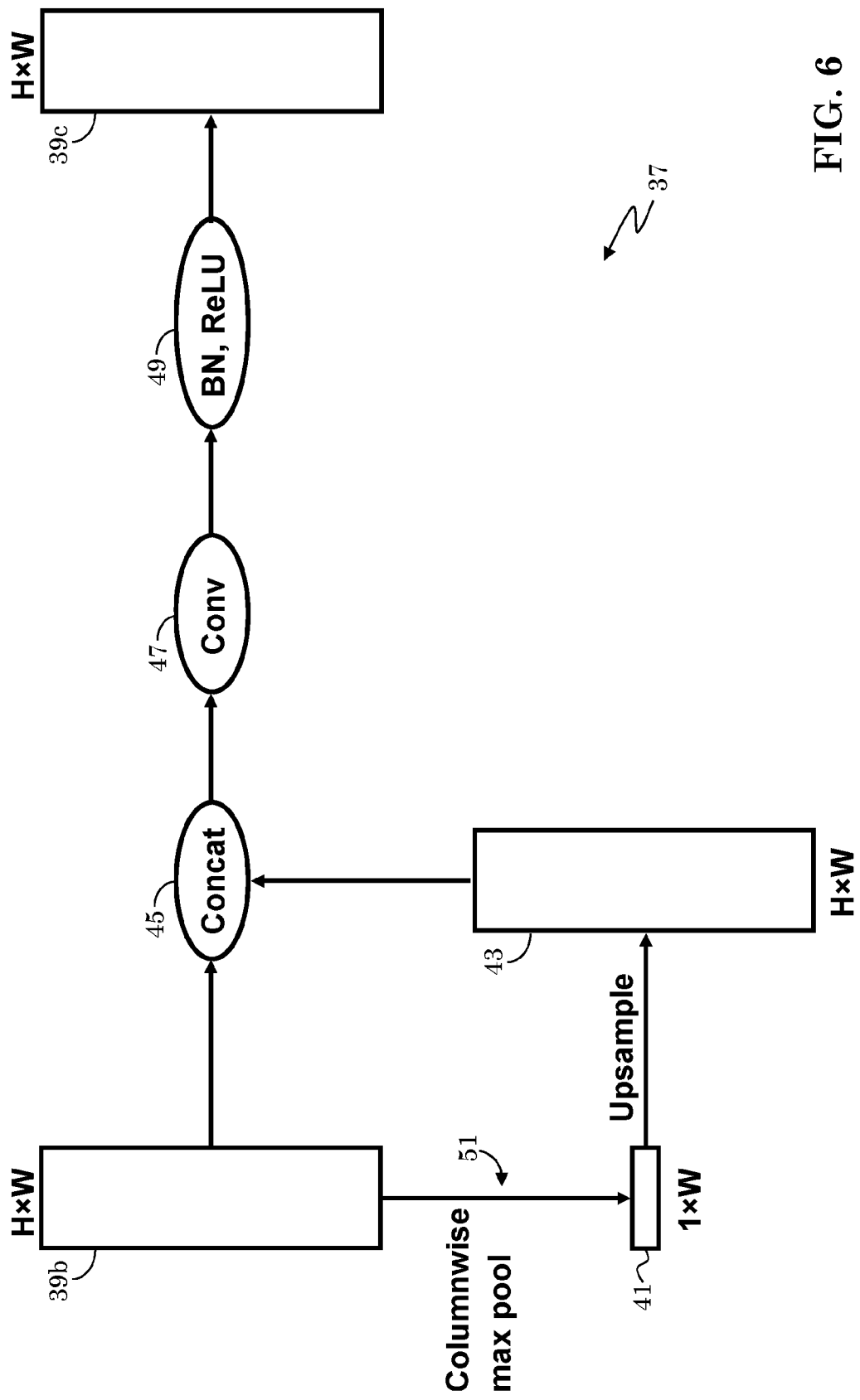
FIG. 6 provides a close-up view of a processing step within the downsampling blocks (e.g., encoding modules) in the contracting path of the neural network of FIG. 5.

FIG. 6 illustrates a more detailed view of exemplary operations (or operational steps) indicated by P-arrow 37 in a downsampling block. This second set of operations applies vertical (or columnwise max) pooling 51 to layer 39b, whose height and width data dimensions are indicated as of H×W. Columnwise pooling 51 defines 1×W pooled data 41 followed by upsampling to define upsampled data 43 matching the dimensional size H×W of layer 39b. At concatenation step 45, the upsampled data 43 is concatenated to the image data from layer 39b before being submitted to a convolution step 47 and to an activation function with batch normalization step 49 to produce the local output layer 39c of the individual block. The addition of a vertical pooling layer 51 lets the present machine model move information quickly between different parts of an image (e.g., move data vertically between different layers of an OCT/OCTA volume). For example, a blood vessel at a first location (x, z) could cause a tail artifact at a second, vertically offset (e.g., deeper) location (x, z+100) without causing a visible change (any tail artifacts) in any intervening region (e.g., at a third location (x, z+50)). Thus, without a "shortcut" connecting those two points (e.g., the first and second locations), the network would have to independently learn several convolutional filters that transferred the information down from the first location a total of 100 pixels to the second location.

As is explained above, each pixel (or voxel) in the volume (or slab or en face) image data includes an additional information channel specifying its depth index information, or position (e.g., z-coordinate), within the volume. This permits the neural network to learn/develop contextually different computations at different axial (e.g., depth) locations based at least in part on the depth index information. Furthermore, the training input samples may include defined retinal landmarks (e.g., structural features determined from the structural OCT data), and the contextually different computations may also be dependent upon local retinal landmarks, such as retinal layers.

Returning to FIG. 5, the output from one downsampling block 31a is max pooled (e.g., 2×2 max pooling), as indicated by a downward arrow, and input to the next downsampling block 31b in the contracting path until reaching an optional "bottleneck" block/module 53 and entering to the expanding path. Optionally, the max pooling function indicated by the downward arrow may be integral to the downsampling block preceding it since it provides a downsampling function. The bottleneck 53 may consist of two convolutional layers (with batch normalization and optional dropout), as illustrated in reference to FIG. 16, but the present implementation adds columnwise pooling, as indicated by the P-arrow. This increases the amount of columnwise pooling the network may do, and this was found to improve performance in testing.

In the expanding path, the output of each block is submitted to a transposed convolution (or deconvolution) stage to upsample the image/information/data. In the present example, the transposed convolution is characterized by a 2×2 kernel (or convolution matrix) with a stride (e.g., shift of the kernel) of 2 (e.g., two pixels or voxels). At the end of the expanding path, the output of the last upsampling block 33a is submitted to another convolution operation (e.g., 1×1 convolution), as indicated by a dotted arrow, before producing its output 57. The neural network may have multiple features per pixels right before reaching the 1×1 convolution, but the 1×1 convolution combines these multiple features into a single output value per pixel, on a pixel-by-pixel level.

Figure 11:
FIG. 11 shows an exemplary B-scan vascular image.

Another difference between the U-Net of FIG. 16 and that of FIG. 5 is the addition of a dynamic pooling layer 32 (e.g., based on retinal structures) following an input layer 34 and preceding the downsampling blocks 31a/31b. As is explained above, before being input to the present network, an additional information channel (e.g., similar to an additional color channel) is concatenated to the input data whose value at every pixel is the z-coordinate (depth) of that pixel/voxel within the volume. This allows the network to perform contextually different computations at different depths while still retaining a fully convolutional structure. That is, the input layer 34 receives input OCT-based data 36 (e.g., OCT structure data and OCTA flow data, including depth index information) and dynamic pooling layer 32 condenses the input OCT-based data (image information) outside a variable depth range defined by the positions of (e.g., pre-selected) retinal landmarks within the received OCT-based data. The retinal landmarks may be (e.g., specific) retinal layers, or other known structures. For example as illustrated in FIGS. 9 and 11, relevant retinal tissue information may be limited to a specific axial range where retinal layers of interest lay, and the depth location of these layers is likely to vary across the volume data. Dynamic pooling layer 32 thus permits the present machine learning model to reduce the amount of data it processes to only that part of the volume that includes the layers of interest, such as layers that are likely to have, or be involved in the production of, flow artifacts, or specific layers that may be of interest to a human reviewer. As an example, dynamic pooling layer 32 may quickly identify the Inner Limiting Membrane (ILM) and the Retinal Pigment Epithelium (RPE) since they are areas of high contrast along an A-scan and generally identify and top and lower layer regions of the retina. See FIG. 9 for brief description of different retinal layers and boundaries in a normal human eye. Other retinal layers may also be identified and associated with their specific depth information. This aids the data processing layers that follow the dynamic pooling layer 32 in applying contextually different computations at different axial locations based at least in part on the depth index information and/or local retinal landmarks (e.g., retinal structures, such as retinal layers). Thus, dynamic pooling layer 32 condenses image information outside a variable depth range defined by the input data itself (e.g., defined by the positions of specific retinal landmarks within the input OCT-based data 36).

As in case of the U-Net of FIG. 16, during a training phase, the output 57 of the present U-Net is compared with a target-output OCTA image 59 by applying a loss function 61 (e.g., L1 loss function, L2 lost function, etc.), and the internal weights of the data processing layers (e.g. the downsampling blocks 31a/31b and upsampling blocks 33a/33b) are adjusted accordingly (such as by a back-propagation process) to reduce this error in a subsequent back-propagation iteration. Optionally, the present neural network may apply a loss function having different weights based on specific retinal layers. That is, the loss function may made to have different weights based on the local proximity of the pre-selected retinal landmarks (e.g., retinal layers) to a current axial position of the OCT image data being processed. For example, the present implementation may use an L1 loss function reweighted such that the region of an input OCTA (or OCT) volume between the inner limiting layer (ILM) and the retinal pigment epithelium (RPE) is more heavily weighted by at least one order of magnitude (e.g., has 11× the weight) of other regions of the volume.

Figure 7:
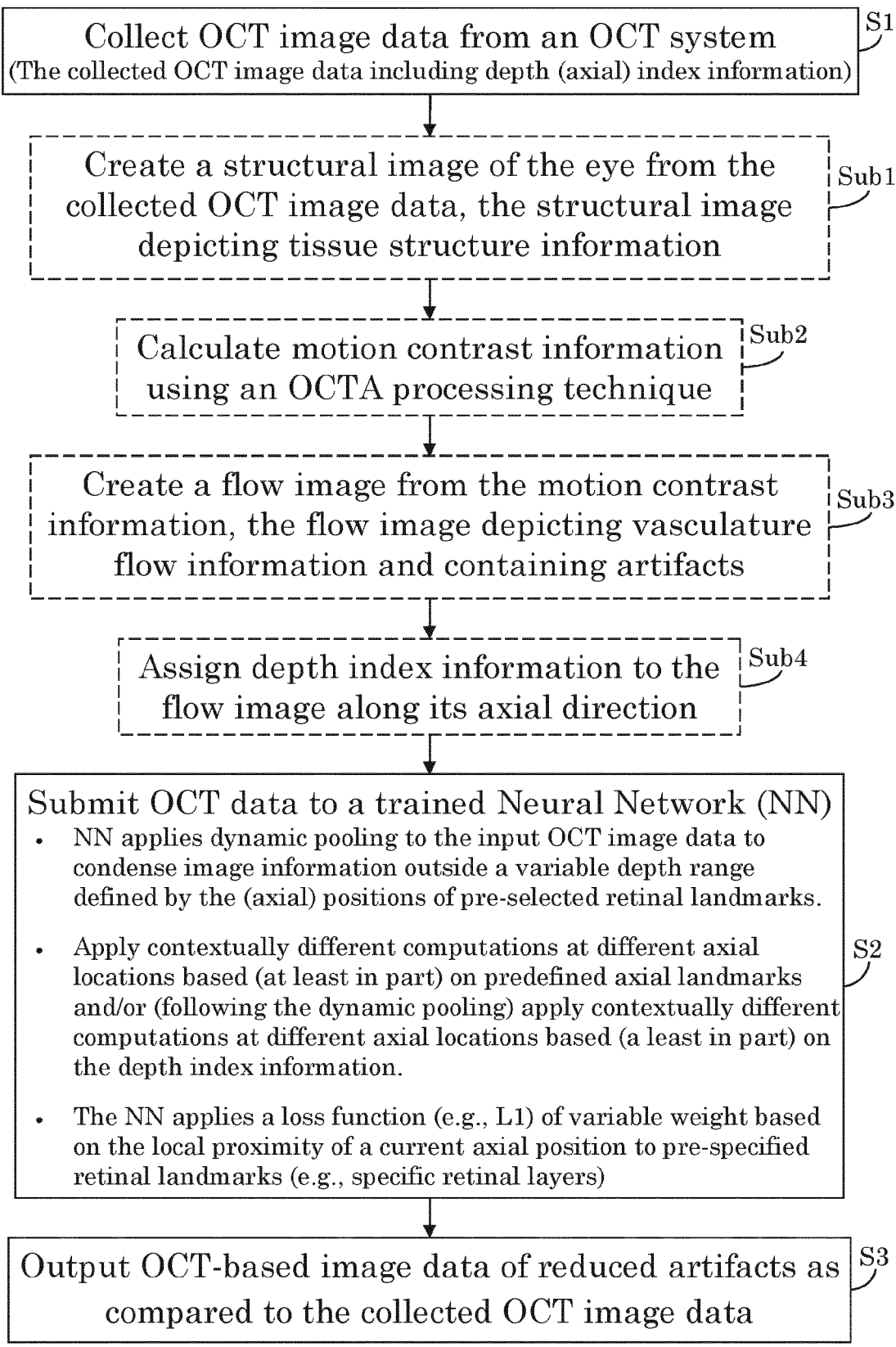
FIG. 7 illustrates a method for reducing artifacts in OCT-based images of an eye in accord with the present invention.

FIG. 7 illustrates an exemplary method to reduce artifacts in OCT-based images of an eye in accord with the present invention. The method may begin in step S1 by collecting OCT image data of the eye from an OCT system, where the collected OCT image data includes depth index information. The OCT image data is submitted to a trained neural network in step S2, where the neural network may have a convolutional structure (e.g., a U-Net) and is trained to apply contextually different computations at different axial locations based at least in part on the depth index information. For example, the different computations may be contextually dependent upon predefined, local retinal landmarks, such as (optionally predefined) retinal layers. In step S3, the trained neural network produces an output OCT-based image of reduced artifacts as compared to the collected OCT image data.

Optionally, the collected OCT image may undergo several data conditioning sub-steps. For example, in sub-step Sub1, structural (OCT) data of the eye is created from the collected OCT image data, where the created structural image depicts ophthalmic tissue structure information, such as retinal layers. Similarly in sub-step Sub2, motion contrast information is calculated (e.g., from the collected OCT image data and/or the initial structural data) using an OCTA processing technique. In sub-step Sub3, a flow (OCTA) image may be created from the motion contrast information, where the flow image depicts vasculature flow information and contains artifacts, such as projection artifacts, decorrelation tails, shadow artifacts, and opacities. In sub-step Sub4, depth index information is assigned to the created flow image along its axial direction. For example, the created flow image may be expanded to include an additional information channel (e.g., an additional color channel per pixel) that incorporates depth index information (e.g., instead of additional color information).

The trained neural network may have several distinguishing characteristics. For example, the neural network may include a dynamic pooling layer following an input layer for condensing image information outside a variable depth range defined by the (e.g., axial/depth) positions of (optionally pre-selected) retinal landmarks (such as retinal layers) within the received OCT image data. The neural network may also have multiple data processing layers following the dynamic pooling layer, where the multiple data processing layers perform contextually different computations at different axial locations based at least in part on the depth index information and/or the (e.g., axial) positions of the retinal landmarks, such as (optionally specific) retinal layers. During the training, the neural network may include an output layer that compares an output of the plurality of data processing layers with a target-output OCTA image and adjusts internal weights of the data processing layers by a back-propagation process. During training, the neural network may apply a loss function (e.g., L1 function) that has different weights based on the local proximity of (optionally pre-selected) retinal landmarks (e.g., retinal layers) to a current axial position of the OCT image data being processed. Optionally, the loss function may have different weights based on specific retinal layers. For example, the loss function may have a first weight for a region between the Inner Limiting Membrane (ILM) and the Retinal Pigment Epithelium (RPE), and a second weight elsewhere. Optionally, the first weight may be an order of magnitude greater than the second weight.

Hereinafter is provided a description of various hardware and architectures suitable for the present invention.

Generally, optical coherence tomography (OCT) uses low-coherence light to produce two-dimensional (2D) and three-dimensional (3D) internal views of biological tissue. OCT enables in vivo imaging of retinal structures. OCT angiography (OCTA) produces flow information, such as vascular flow from within the retina. Examples of OCT systems are provided in U.S. Pat. Nos. 6,741,359 and 9,706,915, and examples of an OCTA systems may be found in U.S. Pat. Nos. 9,700,206 and 9,759,544, all of which are herein incorporated in their entirety by reference. An exemplary OCT/OCTA system is provided herein.

Figure 8:
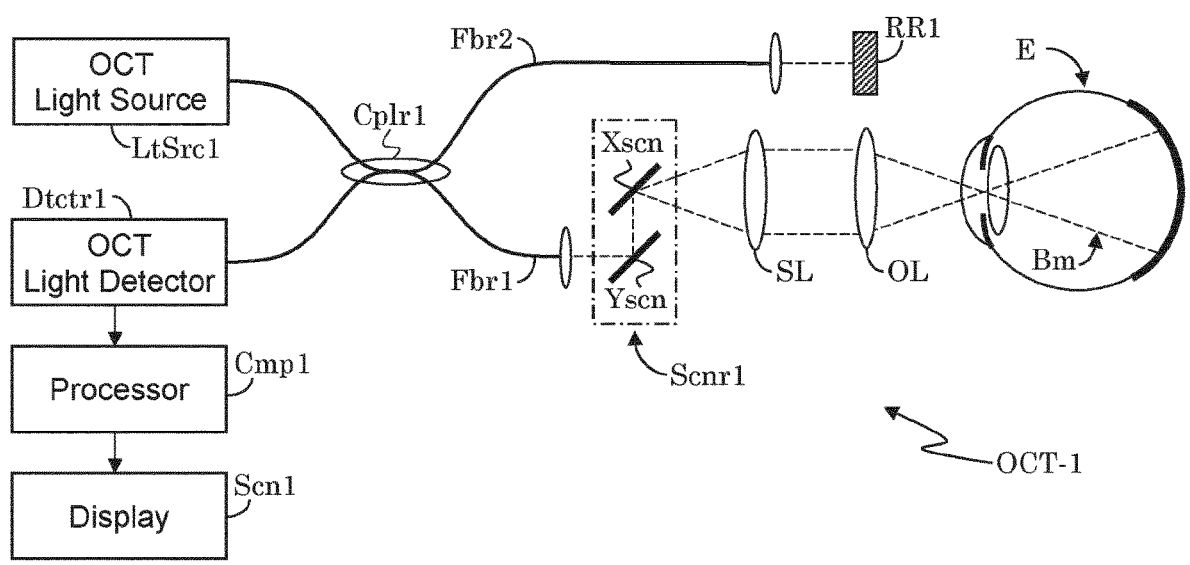
FIG. 8 illustrates a generalized frequency domain optical coherence tomography system used to collect 3D image data of an eye suitable for use with the present invention.

FIG. 8 illustrates a generalized frequency domain optical coherence tomography (FD-OCT) system used to collect 3D image data of the eye suitable for use with the present invention. An FD-OCT system OCT_1 includes a light source, LtSrc1. Typical light sources include, but are not limited to, broadband light sources with short temporal coherence lengths or swept laser sources. A beam of light from light source LtSrc1 is routed, typically by optical fiber Fbr1, to illuminate a sample, e.g., eye E; a typical sample being tissues in the human eye. The light source LrSrc1 may, for example, be a broadband light source with short temporal coherence length in the case of spectral domain OCT (SD-OCT) or a wavelength tunable laser source in the case of swept source OCT (SS-OCT). The light may be scanned, typically with a scanner Scnr1 between the output of the optical fiber Fbr1 and the sample E, so that the beam of light (dashed line Bm) is scanned laterally over the region of the sample to be imaged. The light beam from scanner Scnr1 may pass through a scan lens SL and an ophthalmic lens OL and be focused onto the sample E being imaged. The scan lens SL may receive the beam of light from the scanner Scnr1 at multiple incident angles and produces substantially collimated light, ophthalmic lens OL may then focus the light onto the sample. The present example illustrates a scan beam that needs to be scanned in two lateral directions (e.g., in x and y directions on a Cartesian plane) to scan a desired field of view (FOV). An example of this would be a point-field OCT, which uses a point-field beam to scan across a sample. Consequently, scanner Scnr1 is illustratively shown to include two sub-scanner: a first sub-scanner Xscn for scanning the point-field beam across the sample in a first direction (e.g., a horizontal x-direction); and a second sub-scanner Yscn for scanning the point-field beam on the sample in traversing second direction (e.g., a vertical y-direction). If the scan beam were a line-field beam (e.g., a line-field OCT), which may sample an entire line-portion of the sample at a time, then only one scanner may be needed to scan the line-field beam across the sample to span the desired FOV. If the scan beam were a full-field beam (e.g., a full-field OCT), no scanner may be needed, and the full-field light beam may be applied across the entire, desired FOV at once.

Figure 15:
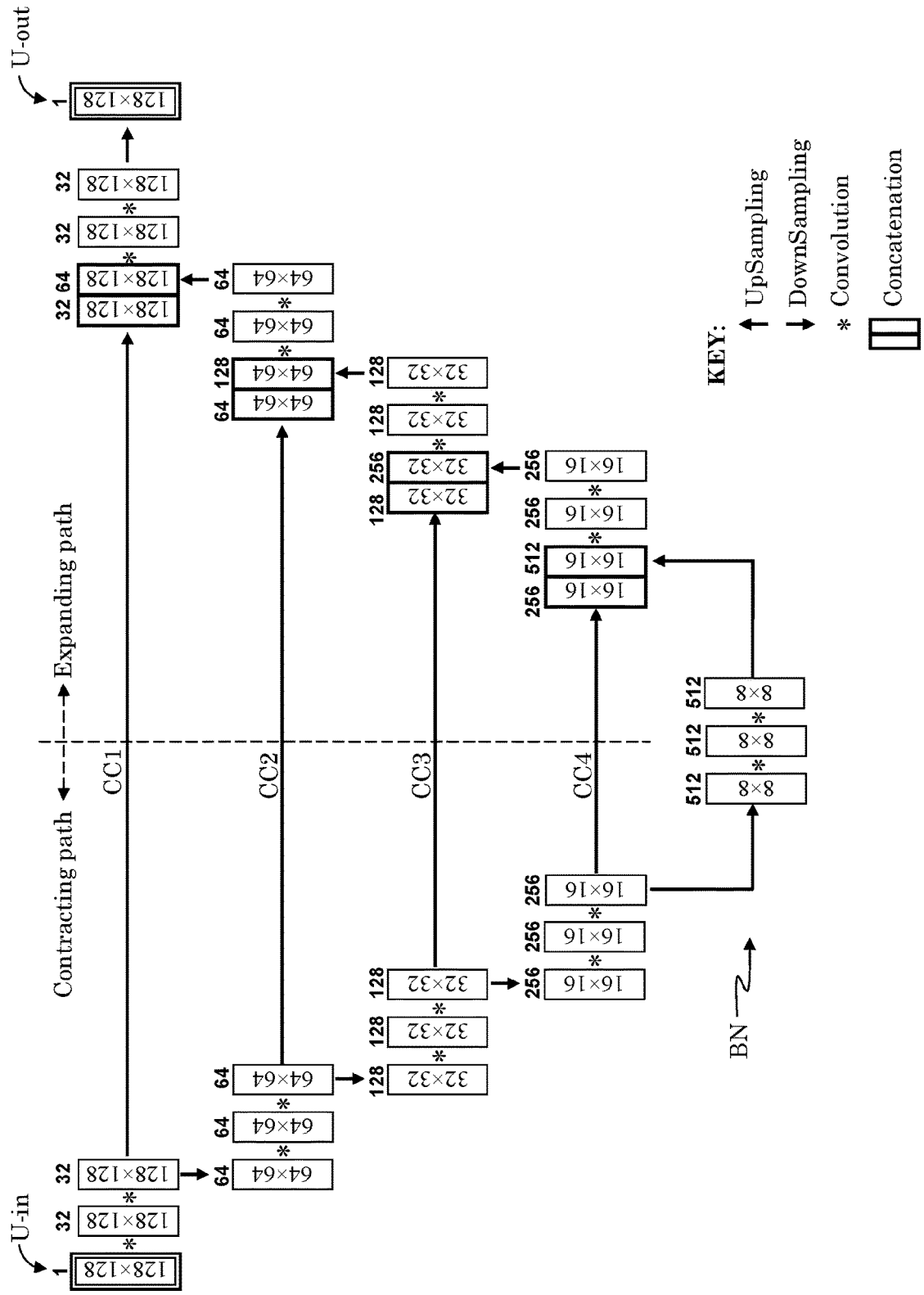
FIG. 15 illustrates an example U-Net architecture.

Irrespective of the type of beam used, light scattered from the sample (e.g., sample light) is collected. In the present example, scattered light returning from the sample is collected into the same optical fiber Fbr1 used to route the light for illumination. Reference light derived from the same light source LtSrc1 travels a separate path, in this case involving optical fiber Fbr2 and retro-reflector RR1 with an adjustable optical delay. Those skilled in the art will recognize that a transmissive reference path can also be used and that the adjustable delay could be placed in the sample or reference arm of the interferometer. Collected sample light is combined with reference light, for example, in a fiber coupler Cplr1, to form light interference in an OCT light detector Dtctr1 (e.g., photodetector array, digital camera, etc.). Although a single fiber port is shown going to the detector Dtctr1, those skilled in the art will recognize that various designs of interferometers can be used for balanced or unbalanced detection of the interference signal. The output from the detector Dtctr1 is supplied to a processor (e.g., internal or external computing device) Cmp1 that converts the observed interference into depth information of the sample. The depth information may be stored in a memory associated with the processor Cmp1 and/or displayed on a display (e.g., computer/electronic display/screen) Scn1. The processing and storing functions may be localized within the OCT instrument, or functions may be offloaded onto (e.g., performed on) an external processor (e.g., an external computing device), to which the collected data may be transferred. An example of a computing device (or computer system) is shown in FIG. 15. This unit could be dedicated to data processing or perform other tasks which are quite general and not dedicated to the OCT device. The processor (computing device) Cmp1 may include, for example, a field-programmable gate array (FPGA), a digital signal processor (DSP), an application specific integrated circuit (ASIC), a graphics processing unit (GPU), a system on chip (SoC), a central processing unit (CPU), a general purpose graphics processing unit (GPGPU), or a combination thereof, that may performs some, or the entire, processing steps in a serial and/or parallelized fashion with one or more host processors and/or one or more external computing devices.

The sample and reference arms in the interferometer could consist of bulk-optics, fiber-optics, or hybrid bulk-optic systems and could have different architectures such as Michelson, Mach-Zehnder or common-path based designs as would be known by those skilled in the art. Light beam as used herein should be interpreted as any carefully directed light path. Instead of mechanically scanning the beam, a field of light can illuminate a one or two-dimensional area of the retina to generate the OCT data (see for example, U.S. Pat. No. 9,332,902; D. Hillmann et al, "Holoscopy—Holographic Optical Coherence Tomography," *Optics Letters*, 36(13): 2390 2011; Y. Nakamura, et al, "High-Speed Three Dimensional Human Retinal Imaging by Line Field Spectral Domain Optical Coherence Tomography," *Optics Express*, 15(12):7103 2007; Blazkiewicz et al, "Signal-To-Noise Ratio Study of Full-Field Fourier-Domain Optical Coherence Tomography," *Applied Optics*, 44(36):7722 (2005)). In time-domain systems, the reference arm needs to have a tunable optical delay to generate interference. Balanced detection systems are typically used in TD-OCT and SS-OCT systems, while spectrometers are used at the detection port for SD-OCT systems. The invention described herein could be applied to any type of OCT system. Various aspects of the invention could apply to any type of OCT system or other types of ophthalmic diagnostic systems and/or multiple ophthalmic diagnostic systems including but not limited to fundus imaging systems, visual field test devices, and scanning laser polarimeters.

In Fourier Domain optical coherence tomography (FD-OCT), each measurement is the real-valued spectral interferogram (Sj(k)). The real-valued spectral data typically goes through several post-processing steps including background subtraction, dispersion correction, etc. The Fourier transform of the processed interferogram, results in a complex valued OCT signal output $Aj(z)=|Aj|ei\varphi$. The absolute value of this complex OCT signal, $|Aj|$, reveals the profile of scattering intensities at different path lengths, and therefore scattering as a function of depth (z-direction) in the sample. Similarly, the phase, $\varphi j$ can also be extracted from the complex valued OCT signal. The profile of scattering as a function of depth is called an axial scan (A-scan). A set of A-scans measured at neighboring locations in the sample produces a cross-sectional image (tomogram or B-scan) of the sample. A collection of B-scans collected at different transverse locations on the sample makes up a data volume or cube. For a particular volume of data, the term fast axis refers to the scan direction along a single B-scan whereas slow axis refers to the axis along which multiple B-scans are collected. The term "cluster scan" may refer to a single unit or block of data generated by repeated acquisitions at the same (or substantially the same) location (or region) for the purposes of analyzing motion contrast, which may be used to identify blood flow. A cluster scan can consist of multiple A-scans or B-scans collected with relatively short time separations at approximately the same location(s) on the sample. Since the scans in a cluster scan are of the same region, static structures remain relatively unchanged from scan to scan within the cluster scan, whereas motion contrast between the scans that meets predefined criteria may be identified as blood flow.

A variety of ways to create B-scans are known in the art including but not limited to: along the horizontal or x-direction, along the vertical or y-direction, along the diagonal of x and y, or in a circular or spiral pattern. B-scans may be in the x-z dimensions but may be any cross-sectional image that includes the z-dimension. An example OCT B-scan image of a normal retina of a human eye is illustrated in FIG. 9. An OCT B-scan of the retinal provides a view of the structure of retinal tissue. For illustration purposes, FIG. 9 identifies various canonical retinal layers and layer boundaries. The identified retinal boundary layers include (from top to bottom): the inner limiting membrane (ILM) Lyer1, the retinal nerve fiber layer (BNFL or NFL) Layr2, the ganglion cell layer (GCL) Layr3, the inner plexiform layer (IPL) Layr4, the inner nuclear layer (INL) Layr5, the outer plexiform layer (OPL) Layr6, the outer nuclear layer (ONL) Layr7, the junction between the outer segments (OS) and inner segments (IS) (indicated by reference character Layr8) of the photoreceptors, the external or outer limiting membrane (ELM or OLM) Layr9, the retinal pigment epithelium (RPE) Layr10, and the Bruch's membrane (BM) Layr11.

In OCT Angiography, or Functional OCT, analysis algorithms may be applied to OCT data collected at the same, or approximately the same, sample locations on a sample at different times (e.g., a cluster scan) to analyze motion or flow (see for example US Patent Publication Nos. 2005/0171438, 2012/0307014, 2010/0027857, 2012/0277579 and U.S. Pat. No. 6,549,801, all of which are herein incorporated in their entirety by reference). An OCT system may use any one of a number of OCT angiography processing algorithms (e.g., motion contrast algorithms) to identify blood flow. For example, motion contrast algorithms can be applied to the intensity information derived from the image data (intensity-based algorithm), the phase information from the image data (phase-based algorithm), or the complex image data (complex-based algorithm). An en face image is a 2D projection of 3D OCT data (e.g., by averaging the intensity of each individual A-scan, such that each A-scan defines a pixel in the 2D projection). Similarly, an en face vasculature image is an image displaying motion contrast signal in which the data dimension corresponding to depth (e.g., z-direction along an A-scan) is displayed as a single representative value (e.g., a pixel in a 2D projection image), typically by summing or integrating all or an isolated portion of the data (see for example U.S. Pat. No. 7,301,644 herein incorporated in its entirety by reference). OCT systems that provide an angiography imaging functionality may be termed OCT angiography (OCTA) systems.

Figure 10:
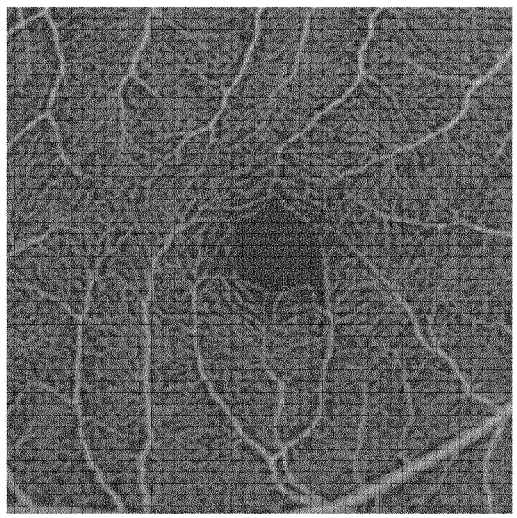
FIG. 10 shows an exemplary en face vasculature image.

FIG. 10 shows an example of an en face vasculature image. After processing the data to highlight motion contrast using any of the motion contrast techniques known in the art, a range of pixels corresponding to a given tissue depth from the surface of internal limiting membrane (ILM) in retina, may be summed to generate the en face (e.g., frontal view) image of the vasculature. FIG. 11 shows an exemplary B-scan of a vasculature (OCTA) image. As illustrated, structural information may not be well-defined since blood flow may traverse multiple retinal layers making them less defined than in a structural OCT B-scan, as shown in FIG. 9. Nonetheless, OCTA provides a non-invasive technique for imaging the microvasculature of the retina and the choroid, which may be critical to diagnosing and/or monitoring various pathologies. For example, OCTA may be used to identify diabetic retinopathy by identifying microaneurysms, neovascular complexes, and quantifying foveal avascular zone and nonperfused areas. Moreover, OCTA has been shown to be in good agreement with fluorescein angiography (FA), a more traditional, but more evasive, technique requiring the injection of a dye to observe vascular flow in the retina. Additionally, in dry age-related macular degeneration, OCTA has been used to monitor a general decrease in choriocapillaris flow. Similarly in wet age-related macular degeneration, OCTA can provides a qualitative and quantitative analysis of choroidal neovascular membranes. OCTA has also been used to study vascular occlusions, e.g., evaluation of nonperfused areas and the integrity of superficial and deep plexus.

Neural Networks

As discussed above, the present invention may use a neural network (NN) machine learning (ML) model. For the sake of completeness, a general discussion of neural networks is provided herein. The present invention may use any, singularly or in combination, of the below described neural network architecture(s). A neural network, or neural net, is a (nodal) network of interconnected neurons, where each neuron represents a node in the network. Groups of neurons may be arranged in layers, with the outputs of one layer feeding forward to a next layer in a multilayer perceptron (MLP) arrangement. MLP may be understood to be a feedforward neural network model that maps a set of input data onto a set of output data.

Figure 12:
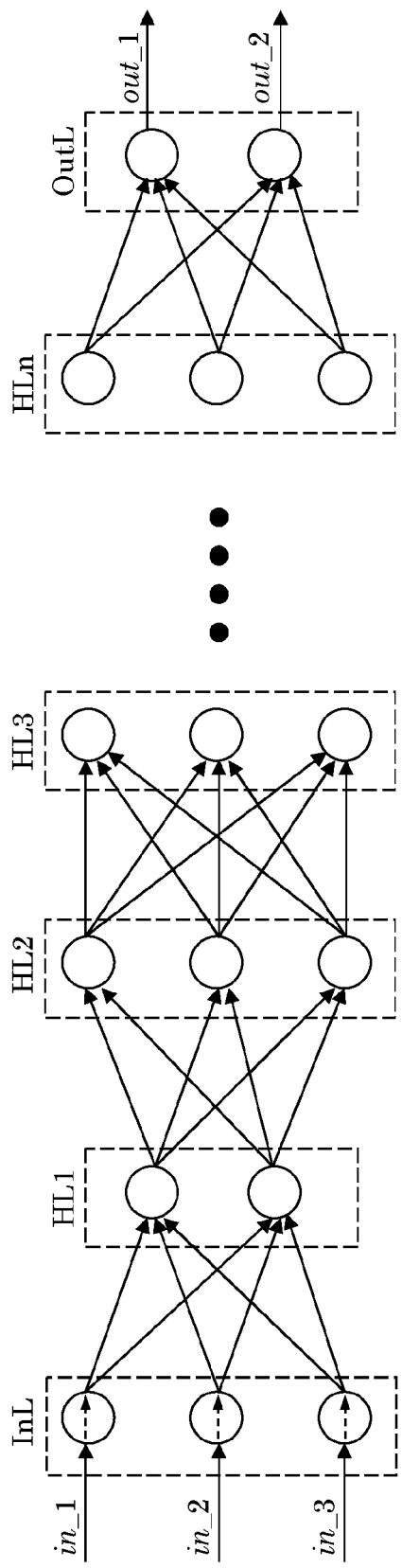
FIG. 12 illustrates an example of a multilayer perceptron (MLP) neural network.

FIG. 12 illustrates an example of a multilayer perceptron (MLP) neural network. Its structure may include multiple hidden (e.g., internal) layers HL1 to HLn that map an input layer InL (that receives a set of inputs (or vector input) in_1 to in_3) to an output layer OutL that produces a set of outputs (or vector output), e.g., out_1 and out_2. Each layer may have any given number of nodes, which are herein illustratively shown as circles within each layer. In the present example, the first hidden layer HL1 has two nodes, while hidden layers HL2, HL3, and HLn each have three nodes. Generally, the deeper the MLP (e.g., the greater the number of hidden layers in the MLP), the greater its capacity to learn. The input layer InL receives a vector input (illustratively shown as a three-dimensional vector consisting of in_1, in_2 and in_3), and may apply the received vector input to the first hidden layer HL1 in the sequence of hidden layers. An output layer OutL receives the output from the last hidden layer, e.g., HLn, in the multilayer model, processes its inputs, and produces a vector output result (illustratively shown as a two-dimensional vector consisting of out_1 and out_2).

Typically, each neuron (or node) produces a single output that is fed forward to neurons in the layer immediately following it. But each neuron in a hidden layer may receive multiple inputs, either from the input layer or from the outputs of neurons in an immediately preceding hidden layer. In general, each node may apply a function to its inputs to produce an output for that node. Nodes in hidden layers (e.g., learning layers) may apply the same function to their respective input(s) to produce their respective output(s). Some nodes, however, such as the nodes in the input layer InL receive only one input and may be passive, meaning that they simply relay the values of their single input to their output(s), e.g., they provide a copy of their input to their output(s), as illustratively shown by dotted arrows within the nodes of input layer InL.

Figure 13:
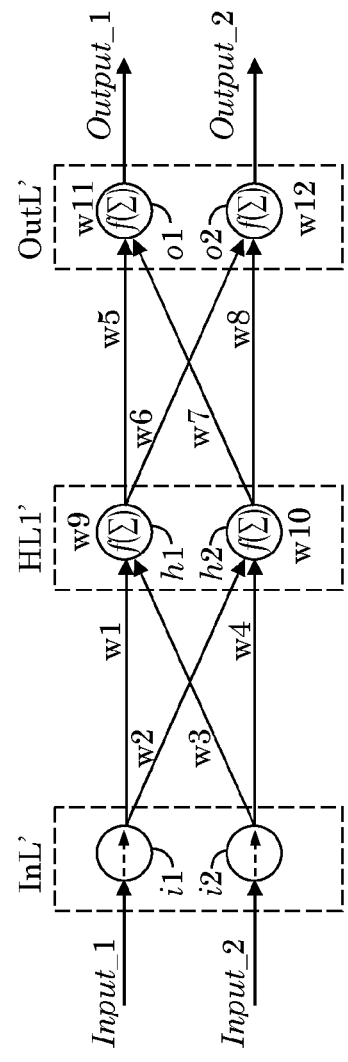
FIG. 13 shows a simplified neural network consisting of an input layer, a hidden layer, and an output layer.

For illustration purposes, FIG. 13 shows a simplified neural network consisting of an input layer InL', a hidden layer HL1', and an output layer OutL'. Input layer InL' is shown having two input nodes i1 and i2 that respectively receive inputs Input_1 and Input_2 (e.g. the input nodes of layer InL' receive an input vector of two dimensions). The input layer InL' feeds forward to one hidden layer HL1' having two nodes h1 and h2, which in turn feeds forward to an output layer OutL' of two nodes o1 and o2. Interconnections, or links, between neurons (illustrative shown as solid arrows) have weights w1 to w8. Typically, except for the input layer, a node (neuron) may receive as input the outputs of nodes in its immediately preceding layer. Each node may calculate its output by multiplying each of its inputs by each input's corresponding interconnection weight, summing the products of it inputs, adding (or multiplying by) a constant defined by another weight or bias that may be associated with that particular node (e.g., node weights w9, w10, w11, w12 respectively corresponding to nodes h1, h2, o1, and o2), and then applying a non-linear function or logarithmic function to the result. The non-linear function may be termed an activation function or transfer function. Multiple activation functions are known the art, and selection of a specific activation function is not critical to the present discussion. It is noted, however, that operation of the ML model, or behavior of the neural net, is dependent upon weight values, which may be learned so that the neural network provides a desired output for a given input.

The neural net learns (e.g., is trained to determine) appropriate weight values to achieve a desired output for a given input during a training, or learning, stage. Before the neural net is trained, each weight may be individually assigned an initial (e.g., random and optionally non-zero) value, e.g. a random-number seed. Various methods of assigning initial weights are known in the art. The weights are then trained (optimized) so that for a given training vector input, the neural network produces an output close to a desired (predetermined) training vector output. For example, the weights may be incrementally adjusted in thousands of iterative cycles by a technique termed back-propagation. In each cycle of back-propagation, a training input (e.g., vector input or training input image/sample) is fed forward through the neural network to determine its actual output (e.g., vector output). An error for each output neuron, or output node, is then calculated based on the actual neuron output and a target training output for that neuron (e.g., a training output image/sample corresponding to the present training input image/sample). One then propagates back through the neural network (in a direction from the output layer back to the input layer) updating the weights based on how much effect each weight has on the overall error so that the output of the neural network moves closer to the desired training output. This cycle is then repeated until the actual output of the neural network is within an acceptable error range of the desired training output for the given training input. As it would be understood, each training input may require many back-propagation iterations before achieving a desired error range. Typically, an epoch refers to one back-propagation iteration (e.g., one forward pass and one backward pass) of all the training samples, such that training a neural network may require many epochs. Generally, the larger the training set, the better the performance of the trained ML model, so various data augmentation methods may be used to increase the size of the training set. For example, when the training set includes pairs of corresponding training input images and training output images, the training images may be divided into multiple corresponding image segments (or patches). Corresponding patches from a training input image and training output image may be paired to define multiple training patch pairs from one input/output image pair, which enlarges the training set. Training on large training sets, however, places high demands on computing resources, e.g. memory and data processing resources. Computing demands may be reduced by dividing a large training set into multiple mini-batches, where the mini-batch size defines the number of training samples in one forward/backward pass. In this case, and one epoch may include multiple mini-batches. Another issue is the possibility of a NN overfitting a training set such that its capacity to generalize from a specific input to a different input is reduced. Issues of overfitting may be mitigated by creating an ensemble of neural networks or by randomly dropping out nodes within a neural network during training, which effectively removes the dropped nodes from the neural network. Various dropout regulation methods, such as inverse dropout, are known in the art.

It is noted that the operation of a trained NN machine model is not a straight-forward algorithm of operational/ analyzing steps. Indeed, when a trained NN machine model receives an input, the input is not analyzed in the traditional sense. Rather, irrespective of the subject or nature of the input (e.g., a vector defining a live image/scan or a vector defining some other entity, such as a demographic description or a record of activity) the input will be subjected to the same predefined architectural construct of the trained neural network (e.g., the same nodal/layer arrangement, trained weight and bias values, predefined convolution/deconvolution operations, activation functions, pooling operations, etc.), and it may not be clear how the trained network's architectural construct produces its output. Furthermore, the values of the trained weights and biases are not deterministic and depend upon many factors, such as the amount of time the neural network is given for training (e.g., the number of epochs in training), the random starting values of the weights before training starts, the computer architecture of the machine on which the NN is trained, selection of training samples, distribution of the training samples among multiple mini-batches, choice of activation function(s), choice of error function(s) that modify the weights, and even if training is interrupted on one machine (e.g., having a first computer architecture) and completed on another machine (e.g., having a different computer architecture). The point is that the reasons why a trained ML model reaches certain outputs is not clear, and much research is currently ongoing to attempt to determine the factors on which a ML model bases its outputs. Therefore, the processing of a neural network on live data cannot be reduced to a simple algorithm of steps. Rather, its operation is dependent upon its training architecture, training sample sets, training sequence, and various circumstances in the training of the ML model.

In summary, construction of a NN machine learning model may include a learning (or training) stage and a classification (or operational) stage. In the learning stage, the neural network may be trained for a specific purpose and may be provided with a set of training examples, including training (sample) inputs and training (sample) outputs, and optionally including a set of validation examples to test the progress of the training. During this learning process, various weights associated with nodes and node-interconnections in the neural network are incrementally adjusted in order to reduce an error between an actual output of the neural network and the desired training output. In this manner, a multi-layer feedforward neural network (such as discussed above) may be made capable of approximating any measurable function to any desired degree of accuracy. The result of the learning stage is a (neural network) machine learning (ML) model that has been learned (e.g., trained). In the operational stage, a set of test inputs (or live inputs) may be submitted to the learned (trained) ML model, which may apply what it has learned to produce an output prediction based on the test inputs.

Like the regular neural networks of FIGS. 12 and 13, convolutional neural networks (CNN) are also made up of neurons that have learnable weights and biases. Each neuron receives inputs, performs an operation (e.g., dot product), and is optionally followed by a non-linearity. The CNN, however, may receive raw image pixels at one end (e.g., the input end) and provide classification (or class) scores at the other end (e.g., the output end). Because CNNs expect an image as input, they are optimized for working with volumes (e.g., pixel height and width of an image, plus the depth of the image, e.g., color depth such as an RGB depth defined of three colors: red, green, and blue). For example, the layers of a CNN may be optimized for neurons arranged in 3 dimensions. The neurons in a CNN layer may also be connected to a small region of the layer before it, instead of all of the neurons in a fully-connected NN. The final output layer of a CNN may reduce a full image into a single vector (classification) arranged along the depth dimension.

Figure 14:
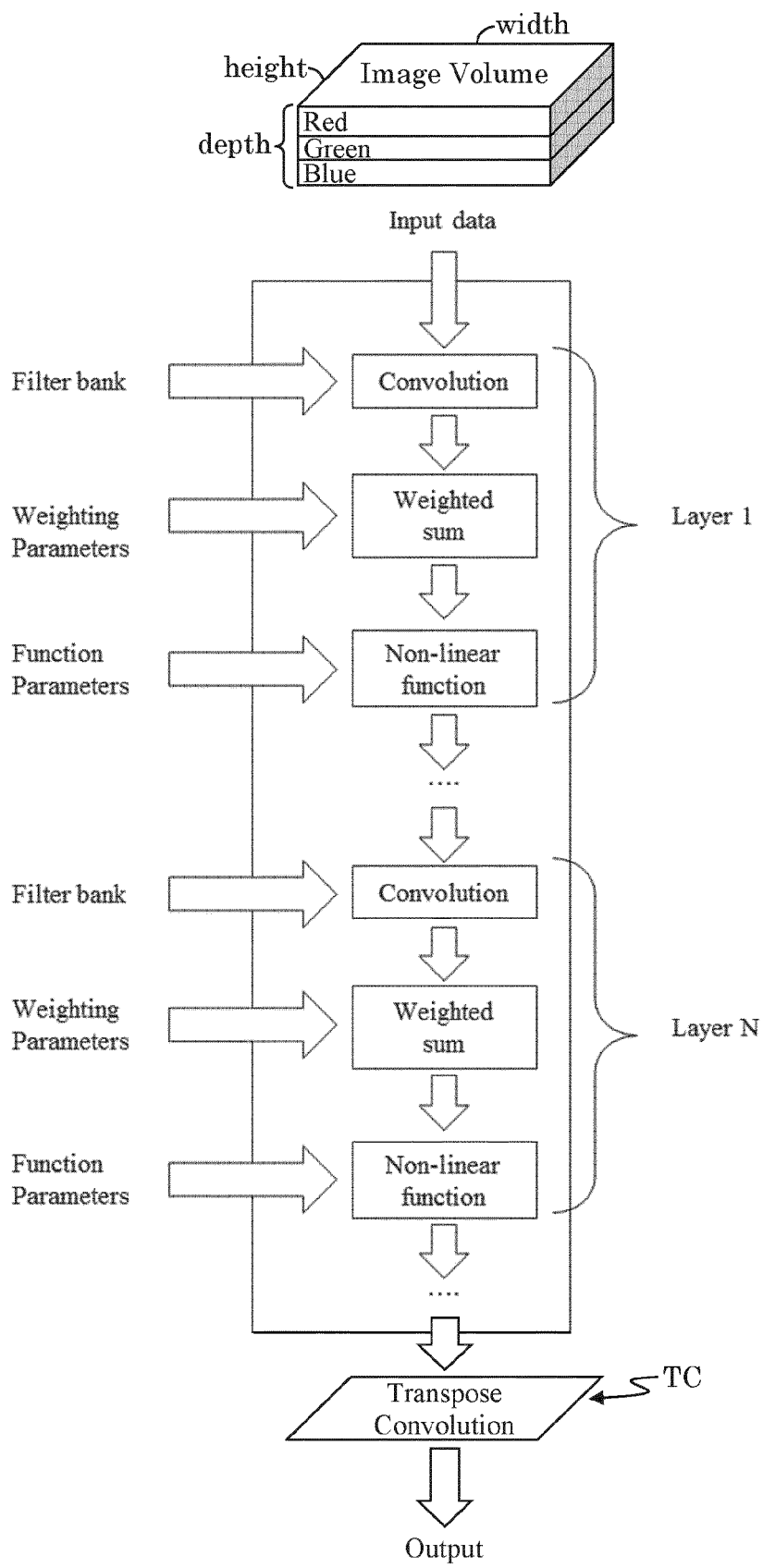
FIG. 14 illustrates an example convolutional neural network architecture.

FIG. 14 provides an example convolutional neural network architecture. A convolutional neural network may be defined as a sequence of two or more layers (e.g., Layer 1 to Layer N), where a layer may include a (image) convolution step, a weighted sum (of results) step, and a non-linear function step. The convolution may be performed on its input data by applying a filter (or kernel), e.g. on a moving window across the input data, to produce a feature map. Each layer and component of a layer may have different pre-determined filters (from a filter bank), weights (or weighting parameters), and/or function parameters. In the present example, the input data is an image, which may be raw pixel values of the image, of a given pixel height and width. In the present example, the input image is illustrated as having a depth of three color channels RGB (Red, Green, and Blue). Optionally, the input image may undergo various preprocessing, and the preprocessing results may be input in place of, or in addition to, the raw input image. Some examples of image preprocessing may include: retina blood vessel map segmentation, color space conversion, adaptive histogram equalization, connected components generation, etc. Within a layer, a dot product may be computed between the given weights and a small region they are connected to in the input volume. Many ways of configuring a CNN are known in the art, but as an example, a layer may be configured to apply an elementwise activation function, such as max (0,x) thresholding at zero. A pooling function may be performed (e.g., along the x-y directions) to down-sample a volume. A fully-connected layer may be used to determine the classification output and produce a one-dimensional output vector, which has been found useful for image recognition and classification. However, for image segmentation, the CNN would need to classify each pixel. Since each CNN layers tends to reduce the resolution of the input image, another stage is needed to up-sample the image back to its original resolution. This may be achieved by application of a transpose convolution (or deconvolution) stage TC, which typically does not use any predefine interpolation method, and instead has learnable parameters.

Convolutional Neural Networks have been successfully applied to many computer vision problems. As explained above, training a CNN generally requires a large training dataset. The U-Net architecture is based on CNNs and can generally can be trained on a smaller training dataset than conventional CNNs.

FIG. 15 illustrates an example U-Net architecture. The present exemplary U-Net includes an input module (or input layer or stage) that receives an input U-in (e.g., input image or image patch) of any given size. For illustration purposes, the image size at any stage, or layer, is indicated within a box that represents the image, e.g., the input module encloses number "128×128" to indicate that input image U-in is comprised of 128 by 128 pixels. The input image may be a fundus image, an OCT/OCTA en face, B-scan image, etc. It is to be understood, however, that the input may be of any size or dimension. For example, the input image may be an RGB color image, monochrome image, volume image, etc. The input image undergoes a series of processing layers, each of which is illustrated with exemplary sizes, but these sizes are illustration purposes only and would depend, for example, upon the size of the image, convolution filter, and/or pooling stages. The present architecture consists of a contracting path (herein illustratively comprised of four encoding modules) followed by an expanding path (herein illustratively comprised of four decoding modules), and copy-and-crop links (e.g., CC1 to CC4) between corresponding modules/stages that copy the output of one encoding module in the contracting path and concatenates it to (e.g., appends it to the back of) the up-converted input of a correspond decoding module in the expanding path. This results in a characteristic U-shape, from which the architecture draws its name. Optionally, such as for computational considerations, a "bottleneck" module/stage (BN) may be positioned between the contracting path and the expanding path. The bottleneck BN may consist of two convolutional layers (with batch normalization and optional dropout).

The contracting path is similar to an encoder, and generally captures context (or feature) information by the use of feature maps. In the present example, each encoding module in the contracting path may include two or more convolutional layers, illustratively indicated by an asterisk symbol "*", and which may be followed by a max pooling layer (e.g., DownSampling layer). For example, input image U-in is illustratively shown to undergo two convolution layers, each with 32 feature maps. As it would be understood, each convolution kernel produces a feature map (e.g., the output from a convolution operation with a given kernel is an image typically termed a "feature map"). For example, input U-in undergoes a first convolution that applies 32 convolution kernels (not shown) to produce an output consisting of 32 respective feature maps. However, as it is known in the art, the number of feature maps produced by a convolution operation may be adjusted (up or down). For example, the number of feature maps may be reduced by averaging groups of feature maps, dropping some feature maps, or other known method of feature map reduction. In the present example, this first convolution is followed by a second convolution whose output is limited to 32 feature maps. Another way to envision feature maps may be to think of the output of a convolution layer as a 3D image whose 2D dimension is given by the listed X-Y planar pixel dimension (e.g., 128×128 pixels), and whose depth is given by the number of feature maps (e.g., 32 planar images deep). Following this analogy, the output of the second convolution (e.g., the output of the first encoding module in the contracting path) may be described as a 128×128×32 image. The output from the second convolution then undergoes a pooling operation, which reduces the 2D dimension of each feature map (e.g., the X and Y dimensions may each be reduced by half). The pooling operation may be embodied within the DownSampling operation, as indicated by a downward arrow. Several pooling methods, such as max pooling, are known in the art and the specific pooling method is not critical to the present invention. The number of feature maps may double at each pooling, starting with 32 feature maps in the first encoding module (or block), 64 in the second encoding module, and so on. The contracting path thus forms a convolutional network consisting of multiple encoding modules (or stages or blocks). As is typical of convolutional networks, each encoding module may provide at least one convolution stage followed by an activation function (e.g., a rectified linear unit (ReLU) or sigmoid layer), not shown, and a max pooling operation. Generally, an activation function introduces non-linearity into a layer (e.g., to help avoid overfitting issues), receives the results of a layer, and determines whether to "activate" the output (e.g., determines whether the value of a given node meets predefined criteria to have an output forwarded to a next layer/node). In summary, the contracting path generally reduces spatial information while increasing feature information.

The expanding path is similar to a decoder, and among other things, may provide localization and spatial information for the results of the contracting path, despite the down sampling and any max-pooling performed in the contracting stage. The expanding path includes multiple decoding modules, where each decoding module concatenates its current up-converted input with the output of a corresponding encoding module. In this manner, feature and spatial information are combined in the expanding path through a sequence of up-convolutions (e.g., UpSampling or transpose convolutions or deconvolutions) and concatenations with high-resolution features from the contracting path (e.g., via CC1 to CC4). Thus, the output of a deconvolution layer is concatenated with the corresponding (optionally cropped) feature map from the contracting path, followed by two convolutional layers and activation function (with optional batch normalization). The output from the last expanding module in the expanding path may be fed to another processing/training block or layer, such as a classifier block, that may be trained along with the U-Net architecture.

Computing Device/System

FIG. 16 illustrates an example computer system (or computing device or computer device). In some embodiments, one or more computer systems may provide the functionality described or illustrated herein and/or perform one or more steps of one or more methods described or illustrated herein. The computer system may take any suitable physical form. For example, the computer system may be an embedded computer system, a system-on-chip (SOC), a single-board computer system (SBC) (such as, for example, a computer-on-module (COM) or system-on-module (SOM)), a desktop computer system, a laptop or notebook computer system, a mesh of computer systems, a mobile telephone, a personal digital assistant (PDA), a server, a tablet computer system, an augmented/virtual reality device, or a combination of two or more of these. Where appropriate, the computer system may reside in a cloud, which may include one or more cloud components in one or more networks.

In some embodiments, the computer system may include a processor Cpnt1, memory Cpnt2, storage Cpnt3, an input/output (I/O) interface Cpnt4, a communication interface Cpnt5, and a bus Cpnt6. The computer system may optionally also include a display Cpnt7, such as a computer monitor or screen.

Processor Cpnt1 includes hardware for executing instructions, such as those making up a computer program. For example, processor Cpnt1 may be a central processing unit (CPU) or a general-purpose computing on graphics processing unit (GPGPU). Processor Cpnt1 may retrieve (or fetch) the instructions from an internal register, an internal cache, memory Cpnt2, or storage Cpnt3, decode and execute the instructions, and write one or more results to an internal register, an internal cache, memory Cpnt2, or storage Cpnt3. In particular embodiments, processor Cpnt1 may include one or more internal caches for data, instructions, or addresses. Processor Cpnt1 may include one or more instruction caches, one or more data caches, such as to hold data tables. Instructions in the instruction caches may be copies of instructions in memory Cpnt2 or storage Cpnt3, and the instruction caches may speed up retrieval of those instructions by processor Cpnt1. Processor Cpnt1 may include any suitable number of internal registers, and may include one or more arithmetic logic units (ALUs). Processor Cpnt1 may be a multi-core processor; or include one or more processors Cpnt1. Although this disclosure describes and illustrates a particular processor, this disclosure contemplates any suitable processor.

Memory Cpnt2 may include main memory for storing instructions for processor Cpnt1 to execute or to hold interim data during processing. For example, the computer system may load instructions or data (e.g., data tables) from storage Cpnt3 or from another source (such as another computer system) to memory Cpnt2. Processor Cpnt1 may load the instructions and data from memory Cpnt2 to one or more internal register or internal cache. To execute the instructions, processor Cpnt1 may retrieve and decode the instructions from the internal register or internal cache. During or after execution of the instructions, processor Cpnt1 may write one or more results (which may be intermediate or final results) to the internal register, internal cache, memory Cpnt2 or storage Cpnt3. Bus Cpnt6 may include one or more memory buses (which may each include an address bus and a data bus) and may couple processor Cpnt1 to memory Cpnt2 and/or storage Cpnt3. Optionally, one or more memory management unit (MMU) facilitate data transfers between processor Cpnt1 and memory Cpnt2. Memory Cpnt2 (which may be fast, volatile memory) may include random access memory (RAM), such as dynamic RAM (DRAM) or static RAM (SRAM). Storage Cpnt3 may include long-term or mass storage for data or instructions. Storage Cpnt3 may be internal or external to the computer system, and include one or more of a disk drive (e.g., hard-disk drive, HDD, or solid-state drive, SSD), flash memory, ROM, EPROM, optical disc, magneto-optical disc, magnetic tape, Universal Serial Bus (USB)-accessible drive, or other type of non-volatile memory.

I/O interface Cpnt4 may be software, hardware, or a combination of both, and include one or more interfaces (e.g., serial or parallel communication ports) for communication with I/O devices, which may enable communication with a person (e.g., user). For example, I/O devices may include a keyboard, keypad, microphone, monitor, mouse, printer, scanner, speaker, still camera, stylus, tablet, touch screen, trackball, video camera, another suitable I/O device, or a combination of two or more of these.

Communication interface Cpnt5 may provide network interfaces for communication with other systems or networks. Communication interface Cpnt5 may include a Bluetooth interface or other type of packet-based communication. For example, communication interface Cpnt5 may include a network interface controller (NIC) and/or a wireless NIC or a wireless adapter for communicating with a wireless network. Communication interface Cpnt5 may provide communication with a WI-FI network, an ad hoc network, a personal area network (PAN), a wireless PAN (e.g., a Bluetooth WPAN), a local area network (LAN), a wide area network (WAN), a metropolitan area network (MAN), a cellular telephone network (such as, for example, a Global System for Mobile Communications (GSM) network), the Internet, or a combination of two or more of these.

Bus Cpnt6 may provide a communication link between the above-mentioned components of the computing system. For example, bus Cpnt6 may include an Accelerated Graphics Port (AGP) or other graphics bus, an Enhanced Industry Standard Architecture (EISA) bus, a front-side bus (FSB), a HyperTransport (HT) interconnect, an Industry Standard Architecture (ISA) bus, an InfiniBand bus, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or other suitable bus or a combination of two or more of these.

Although this disclosure describes and illustrates a particular computer system having a particular number of particular components in a particular arrangement, this disclosure contemplates any suitable computer system having any suitable number of any suitable components in any suitable arrangement.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

While the invention has been described in conjunction with several specific embodiments, it is evident to those skilled in the art that many further alternatives, modifications, and variations will be apparent in light of the foregoing description. Thus, the invention described herein is intended to embrace all such alternatives, modifications, applications and variations as may fall within the spirit and scope of the appended claims.

The invention claimed is:

1. A method to reduce artifacts in optical coherence tomography (OCT)-based images of an eye, said method comprising:
   collecting OCT image data of the eye from an OCT system, the OCT image data including depth index information; and
   submitting the OCT image data to a trained neural network, the neural network applying contextually different computations at different axial locations based at least in part on the depth index information, and producing an output OCT-based image of reduced artifacts as compared to the collected OCT image data.

2. The method of claim 1, wherein the different computations are contextually dependent upon predefined, local retinal landmarks.

3. The method of claim 2, wherein the retinal landmarks are predefined retinal layers.

4. The method of claim 1, wherein the artifacts are one or more of projection artifacts, decorrelation tails, shadow artifacts, and opacities.

5. The method of claim 1, wherein the neural network includes:
   an input layer for receiving the OCT image data;
   a dynamic pooling layer following the input layer for condensing image information outside a variable depth range defined by the positions of pre-selected retinal landmarks within the received OCT image data;
   a plurality of data processing layers following the dynamic pooling layer, the data processing layers performing contextually different computations at different axial locations based at least in part on the depth index information;
   an output layer that compares an output of the plurality of data processing layers with the target-output OCTA image and adjusts internal weights of the data processing layers by a back-propagation process.

6. The method of claim 5, wherein the neural network applies a loss function having different weights based on the local proximity of the pre-selected retinal landmarks to a current axial position of the OCT image data being processed.

7. The method of claim 6, wherein the loss function is an L1 function.

8. The method of claim 5, wherein the pre-selected retinal landmarks are specific retinal layers.

9. The method of claim 8, wherein the neural network applies a loss function having different weights based on specific retinal layers.

10. The method of claim 9, wherein the loss function has a first weight for a region between the Inner Limiting Membrane (ILM) and the Retinal Pigment Epithelium (RPE), and a second weight elsewhere.

11. The method of claim 10, wherein the first weight is at least an order of magnitude greater than the second weight.

12. The method of claim 1, wherein the neural network has a convolutional structure.

13. The method of claim 1, wherein the neural network includes a U-Net structure, the U-net structure including:
   a plurality of encoding modules in a contracting path; and
   a plurality of decoding modules in an expanding path, each decoding module corresponding to a separate encoding module in the contracting path;
   wherein each encoding module applies a convolution to its input and columnwise max pooling to the convolution result to define a reduced image, the reduced image being then upsampled to the dimensions of its input and concatenated to its input followed by another convolution.

14. The method of claim 13, wherein the U-Net structure further includes a bottleneck module between the contracting path and the expanding path, and the bottleneck module applies column-wise pooling.

15. The method of claim 1, further comprising:
   calculating motion contrast information in the collected OCT image data using an OCT angiography (OCTA) processing technique;

creating a structural image of the eye from the collected OCT image data, the structural image depicting tissue structure information;
creating a flow image of the eye from the motion contrast information, the flow image depicting vasculature flow information and containing artifacts;
assigning depth index information to the flow image along its axial direction; and
submitting the structural image, flow image, and assigned depth index information to the trained neural network, the produced output OCT-based image being a vascular image of reduced artifacts as compared to the flow image.

16. The method of claim 15, wherein the artifacts are one or more of projection artifacts, decorrelation tails, shadow artifacts, and opacities.

17. The method of claim 15, wherein producing the output OCT-based image includes determining a difference between an ideal corrected flow data and the created flow image, and adding the difference to the created flow image.

18. The method of claim 1, wherein training the neural network includes:
collecting a plurality of OCT acquisitions to define training-input OCT images;
defining a plurality of OCTA images from the OCT acquisitions to define corresponding training-input OCTA images;
submitting each OCTA image to an artifact removal algorithm to define a corresponding target-output OCTA image of reduced artifacts;
defining a plurality of training-input sets, each training-input set include a training-input OCT image, a corresponding OCTA image, and depth information for the axial positions of pixels within the OCTA image.

19. The method of claim 1, wherein the neural network includes:
an input layer for receiving the structural image, flow image, and assigned depth index information;
a dynamic pooling layer following an input layer for condensing information outside a variable depth range defined by the positions of pre-selected retinal landmarks;
a plurality of data processing layers following the dynamic pooling layer, the data processing layers performing contextually different computations at different axial locations based at least in part on the depth index information;
an output layer that compares an output of the plurality of data processing layers with the target-output OCTA image and adjusts internal weights of the data processing layers by a back-propagation process.

20. The method of claim 19, wherein the retinal landmarks are predefined retinal layers.

* * * * *